(12) United States Patent
Reiffenrath et al.

(10) Patent No.: US 7,462,297 B2
(45) Date of Patent: Dec. 9, 2008

(54) CHIRAL DOPANTS HAVING A LATERALLY ALKYLATED PHENYL STRUCTURAL ELEMENT

(75) Inventors: Volker Reiffenrath, Rossdorf (DE); Michael Heckmeier, Hemsbach (DE)

(73) Assignee: Merck Patent GmbH, Darmstadt (DE)

( * ) Notice: Subject to any disclaimer, the term of this patent is extended or adjusted under 35 U.S.C. 154(b) by 663 days.

(21) Appl. No.: 10/531,375

(22) PCT Filed: Sep. 23, 2003

(86) PCT No.: PCT/EP03/10547

§ 371 (c)(1), (2), (4) Date: Apr. 15, 2005

(87) PCT Pub. No.: WO2004/037948

PCT Pub. Date: May 6, 2004

(65) Prior Publication Data

US 2006/0081813 A1 Apr. 20, 2006

(30) Foreign Application Priority Data

Oct. 18, 2002 (DE) .................... 102 48 765

(51) Int. Cl.
- *C09K 19/00* (2006.01)
- *C09K 19/06* (2006.01)
- *C09K 19/12* (2006.01)
- *C09K 19/20* (2006.01)

(52) U.S. Cl. .............. 252/299.01; 252/299.1; 252/299.2; 252/299.6; 252/299.63; 252/299.66; 428/1.1; 430/20; 430/270.1

(58) Field of Classification Search .......... 430/20, 430/270.1; 252/299.1, 299.2, 299.6, 299.63, 252/299.66, 299.01; 428/1.1
See application file for complete search history.

(56) References Cited

U.S. PATENT DOCUMENTS

| | | | |
|---|---|---|---|
| 5,439,613 A | 8/1995 | Takeshita et al. | |
| 5,679,282 A | 10/1997 | Pauluth et al. | |
| 5,958,290 A * | 9/1999 | Coates et al. | 252/299.01 |
| 5,993,691 A * | 11/1999 | Pausch et al. | 252/299.63 |
| 6,056,893 A | 5/2000 | Reiffenrath et al. | |
| 6,146,720 A * | 11/2000 | Pausch et al. | 428/1.1 |

FOREIGN PATENT DOCUMENTS

| | | |
|---|---|---|
| DE | 43 22 905 | 1/1994 |
| DE | 43 28 761 | 3/1995 |
| DE | 197 46 289 | 5/1998 |
| EP | 0 609 566 | 8/1994 |

* cited by examiner

*Primary Examiner*—Geraldina Visconti
(74) *Attorney, Agent, or Firm*—Millen, White, Zelano & Branigan, P.C.

(57) ABSTRACT

The present invention relates to chiral dopants having a laterally alkylated phenyl unit of the general formula I:

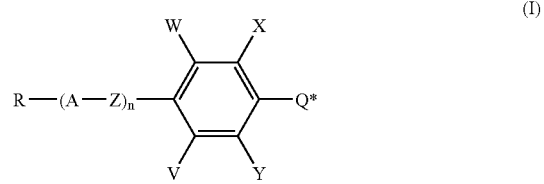

in which Q*, R, A, Z, V, W, X, Y and n are as defined in claim 1, to the use thereof as components in liquid-crystalline mixtures, and to liquid-crystal and electro-optical display elements which contain the liquid-crystalline mixtures according to the invention.

20 Claims, No Drawings

CHIRAL DOPANTS HAVING A LATERALLY ALKYLATED PHENYL STRUCTURAL ELEMENT

The present invention relates to chiral dopants having a laterally alkylated phenyl unit and to liquid-crystalline media which comprise these compounds. The present invention furthermore relates to liquid-crystal displays which contain the liquid-crystal mixtures according to the invention.

In the known liquid-crystal displays, the liquid crystals, generally liquid-crystalline mixtures, are used as dielectrics whose optical properties change reversibly on application of an electric voltage. These liquid-crystal displays use various electro-optical effects. The commonest of these are the TN (twisted nematic) effect, with a homogeneous, virtually planar initial alignment of the liquid crystals and a nematic structure twisted by about 90°, the STN (supertwisted nematic) effect and the SBE (supertwisted birefringence effect), both of which, like the TN effect, use a twisted, homogeneous initial alignment of the liquid crystals, but here the molecules have a significant surface tilt angle ("tilt angle" for short) at the surface of the substrates, and the twist between the substrates is significantly greater than 90°. In this application, unless explicitly stated otherwise, the STN effect and the SBE below are both jointly referred to as the STN effect. The tilt angle at the surface in STN displays is typically between 2° and 10°. It is greater the greater the twist angle. The twist angles are generally from about 180° to 240°, sometimes also up to 260° or 270° and in some cases even greater.

The twist of the liquid-crystal medium by greater than 90° is achieved through the use of chiral liquid-crystal mixtures whose natural twist is selected in accordance with the layer thickness of the liquid-crystal layer. To this end, two possibilities are available to the person skilled in the art. The first consists in the use of liquid crystals which are themselves chiral, i.e. cholesteric liquid crystals. Such liquid crystals themselves have a twisted structure. In a homogeneously oriented arrangement between two substrates, which is known as the Grandjean texture, the director of the molecules is helically twisted in the vertical direction, i.e. over the thickness of the layer.

The characteristic length for a complete rotation through 360° is known as the cholesteric pitch (P). However, the use of cholesteric liquid crystals is often not particularly advantageous since the cholesteric pitch of cholesteric liquid crystals cannot be matched easily to the layer thicknesses of the display cells usually used. In addition, the cholesteric pitch of these liquid crystals is often disadvantageously and in many cases strongly dependent on the temperature. A change in the composition of the mixtures also usually results in considerable changes in the cholesteric pitch.

For this reason, in most practical cases a chiral substance which induces the desired twist is added to a nematic liquid-crystal mixture. It is not particularly important here whether this compound itself has a mesophase. Rather, it is more important that it has a high twisting power for the nematic base mixture (also known as host mixture) and that it does not change the properties of the base mixture, in particular its clearing point, excessively in the concentrations usually employed. Preference is thus generally given to compounds which themselves have a mesogenic structure or are even cholesteric.

The cholesteric phases which are induced by addition of chiral substances to nematic liquid crystals are often known as chirally nematic phases. In the present application, however, these are also referred to as cholesteric phases unless explicitly stated otherwise.

The cholesteric pitch induced by addition of chiral substances (dopants) to nematic liquid crystals is dependent at a given temperature, besides on the enantiomeric purity of the chiral dopant, in particular on the dopant concentration (c) employed and on the twisting power of the dopant. This twisting power is known as the HTP (helical twisting power). To a first approximation, the induced cholesteric pitch (P) is inversely proportional to the product of HTP and dopant concentration employed, as shown in equation (1).

$$P = (HTP \cdot c)^{-1} \qquad (1)$$

In STN displays, use is typically made of liquid-crystal mixtures having a cholesteric pitch to layer thickness ratio (d/P) in the range from 0.4 to 0.8, frequently of about 0.5.

However, chiral liquid-crystal mixtures are also used in TN displays, here in order to avoid twist in the reverse direction (reverse twist). Occurrence of this would result in the formation of domains and thus in a reduction in contrast. In TN displays, use is generally made of cholesteric liquid-crystal mixtures having a significantly smaller d/P ratio than in STN displays since larger d/P values in most cases result in an increase in the threshold voltage. The values here are typically from about 0.01 to 0.3, frequently about 0.1.

Besides these display types, there are further liquid-crystal displays which use liquid-crystal mixtures doped with chiral compounds.

Known chiral dopants are, for example, the compounds C15, CB15, R-811 and S-811, R-1011 and S-1011, and R-2011 and S-2011, all Merck KGaA.

In these and similar electro-optical effects, use is made of liquid-crystalline media of positive dielectric anisotropy ($\Delta\epsilon$).

Besides the electro-optical effects mentioned which require liquid-crystal media of positive dielectric anisotropy, there are other electro-optical effects which use liquid-crystal media of negative dielectric anisotropy, such as, for example, the ECB (electrically controlled birefringence) effect and its sub-forms DAP (deformation of aligned phases), VAN (vertically aligned nematics) and CSH (colour super homeotropics). In these and similar electro-optical effects, use is made of liquid-crystalline media of negative dielectric anisotropy ($\Delta\epsilon$).

An electro-optical effect having excellent, low viewing-angle dependence of the contrast uses axially symmetrical micropixels (ASMs). In this effect, the liquid crystal of each pixel is surrounded cylindrically by a polymer material. This mode is particularly suitable for combination with addressing through plasma channels. In particular, large-area PA LCDs having good viewing-angle dependence of the contrast can be achieved in this way. The IPS (in plane switching) effect employed to an increased extent recently can use both dielectrically positive and dielectrically negative liquid-crystal media, similar to guest-host displays, which can employ dyes either in dielectrically positive or in dielectrically negative media, depending on the display mode used.

The pixels of the liquid-crystal displays can be addressed directly, time-sequentially, i.e. in time-multiplex mode, or by means of a matrix of active, electrically non-linear elements.

The most common AMDs (active matrix displays) hitherto use discrete active electronic switching elements, such as, for example, three-pole switching elements, such as MOS (metal oxide silicon) transistors or thin-film transistors (TFTs) or varistors or 2-pole switching elements, such as, for example, MIM (metal insulator metal) diodes, ring diodes or back-to-back diodes. In the TFTs, various semiconductor materials, predominantly silicon or alternatively cadmium selenide, are used. In particular, amorphous silicon or polycrystalline silicon is used.

Thus, DE 43 22 905 A1 discloses chiral 2,6-difluorobenzene derivatives of the formula:

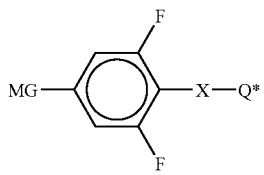

in which
MG is a mesogenic group which is free from ester groups,
X is O or $CH_2$, and
Q* is a chiral radical having at least one chiral carbon atom.

The use of these derivatives as dopant in tilted smectic liquid-crystal phases results, even when added in small amounts, in strong twisting in the cholesteric phase. Electro-optical displays containing these liquid-crystalline media are also disclosed.

EP 0 609 566 A1 likewise discloses liquid-crystalline compositions which comprise chiral compounds of the formula

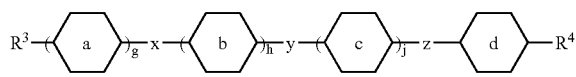

in which the rings
a, b, c and d, independently of one another, are trans-1,4-cyclohexylene, 1-cyclohexene-1,4-diyl or 1,4-phenylene,
g, h and i are each 0 or 1, where $(g+h+i) \geq 1$,
x, y and z, independently of one another, are a single bond, —$CH_2CH_2$—, —CH=CH—, —C≡C—, —$OCH_2$— or —$CH_2O$—,
$R^3$ and $R^4$, independently of one another, are H, $C_nH_{2n+1}$—, $C_nH_{2n+1}$—O—, $C_nH_{2n+1}$—O—$C_kH_{2k}$—, $C_nH_{2n-1}$—, $C_nH_{2n-1}$—O—, $C_nH_{2n-1}$—O—$C_kH_{2k}$—, $C_nH_{2n-3}$—, $C_nH_{2n-3}$—O— or $C_nH_{2n-3}$—O—$C_kH_{2k}$—, and
n and k, independently of one another, are an integer from 1 to 18, where $(n+k) \leq 18$,
where at least one H atom in the formula may be replaced by an F atom, and at least one of the radicals $R^3$, $R^4$, x, y and z has an asymmetric carbon atom.

The chiral dopants known from the prior art have the disadvantage that they only result in inadequate twisting in LC mixtures and in addition adversely affect the properties of the LC mixtures.

Based on the cited prior art, it can be regarded as the object of the present invention to provide novel chiral dopants, in particular for TFT-LC mixtures, which are superior to the prior art and which preferably do not adversely affect the properties of the LC material.

Surprisingly, it has been found that the alkyl-substituted dopants according to the invention have a significantly greater helical twisting power (HTP) than the corresponding H- or F-substituted compounds.

The present invention thus relates to chiral dopants having a laterally alkylated phenyl unit of the general formula I:

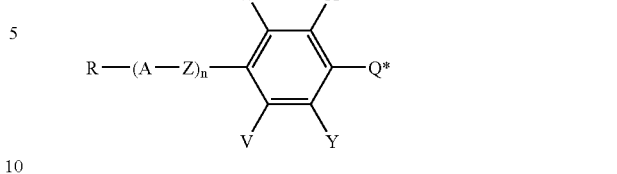

in which:
Q* is a unit having an asymmetric carbon atom,
R is —H, an alkyl or alkenyl radical having from 1 to 12 carbon atoms which is unsubstituted or at least monosubstituted by halogen, and in which one or more non-adjacent —$CH_2$— groups may be replaced by —O— or —S— and/or —C≡C—, as well as F or Cl,
A, independently of one another, are a single bond, 1,4-phenylene, in which, in addition, one or more H atoms may be replaced by F, 1,4-cyclohexylene, in which, in addition, one or two $CH_2$ groups may be replaced by —O—, or 1,4-bicyclo[2.2.2]octanyl,
Z, independently of one another, are a single bond, —$CH_2$—$CH_2$—, —O—$CH_2$—, —$CH_2$—O—, —$CF_2$—O—, —O—$CF_2$—, —$CF_2$—$CF_2$— or —C≡C—,
V and W, independently of one another, are linear or branched alkyl or alkoxy having from 1 to 12 carbon atoms which is unsubstituted or monosubstituted or polysubstituted by halogen, or H, F or Cl,
X and Y, independently of one another, are linear or branched alkyl or alkoxy having o or p carbon atoms which is unsubstituted or monosubstituted or polysubstituted by halogen, where o and p, independently of one another, are identical or different and are integers in the range from 1 to 12, H, F or Cl, where in the case of H, F and Cl, o or p=0, or trimethylsilyl, and
n is from 1 to 3, preferably 2 or 3,
with the proviso that X and/or Y is/are either an unsubstituted or halogen-substituted alkyl or alkoxy radical having o or p carbon atoms, where the sum o+p is $\geq 2$, or a trimethylsilyl radical.

Preference is given to structures in which the chiral centre is separated from the ortho-alkylated aromatic ring by not more than 3 bonds (or 2 atoms).

Preference is furthermore given to structures which contain no hydrolysable units, such as, for example, ester bridges.

Unit Q* having an asymmetric carbon atom is likewise preferably:

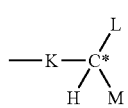

in which:
K: is —$CH_2$—, —O—, —$CH_2CH_2$—, —$OCH_2$—, —$CH_2O$—, —$OCF_2$—, —$CF_2O$—, —C≡C—, —CH=CH— or a single bond, and
L and M: are alkyl, cycloalkyl, O-alkyl, alkenyl, alkynyl or aryl, where L must be different from M.

Unit Q* having an asymmetric carbon atom is particularly preferably:
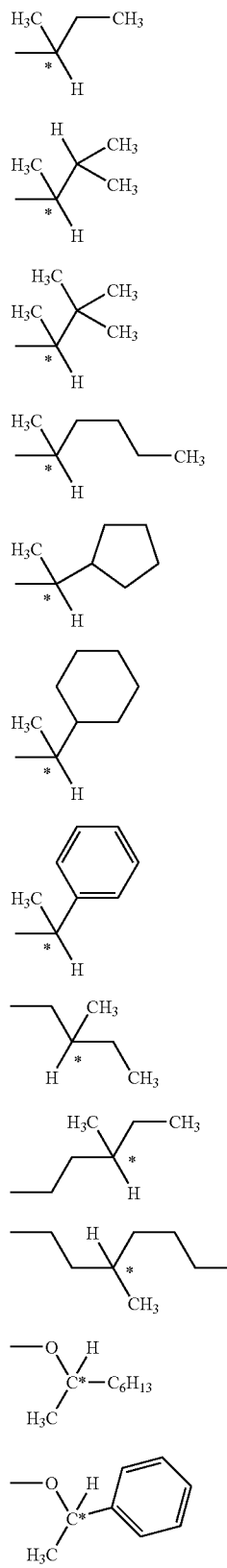
(a) (b) (c) (d) (e) (f) (g) (h) (i) (k) (m) (n)
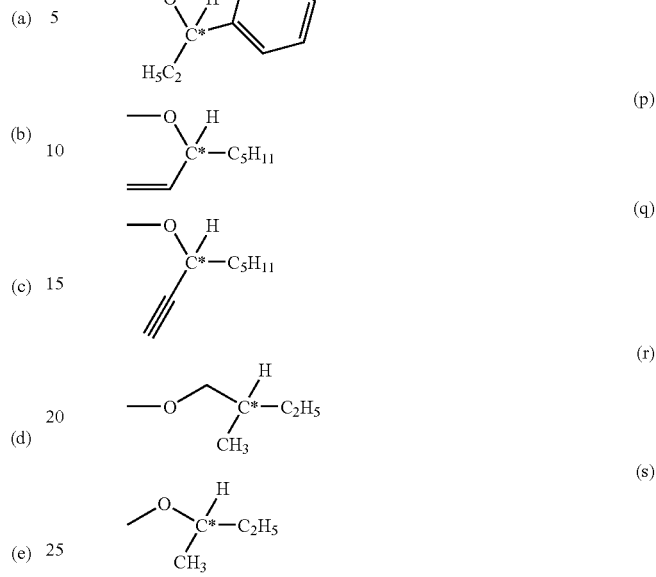
(o) (p) (q) (r) (s)
Especial preference is given to units (h), (i), (m), (r) and (s) mentioned.
Preference is given to chiral dopants having the following basic structure:
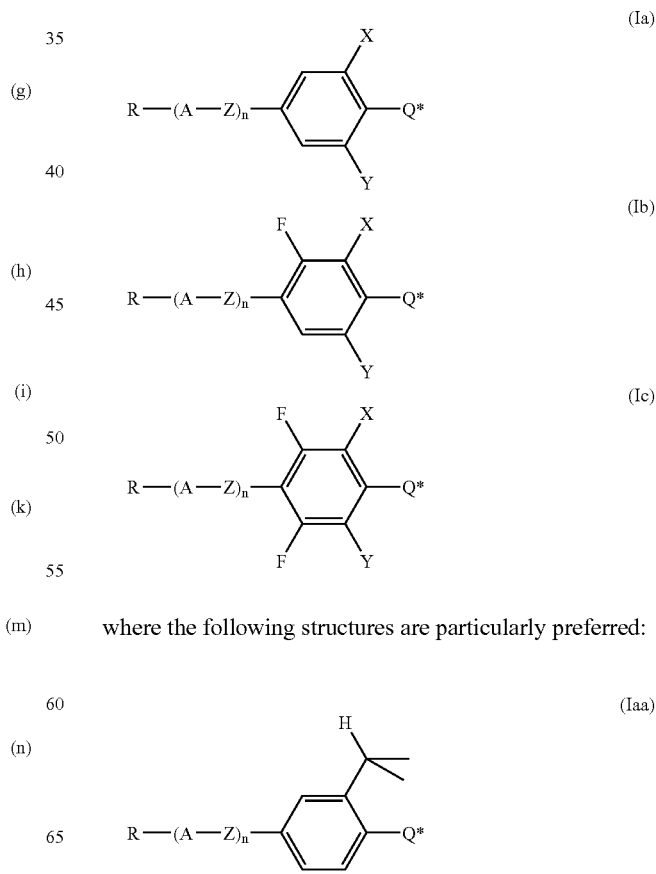
(Ia) (Ib) (Ic)
where the following structures are particularly preferred:
(Iaa)

-continued
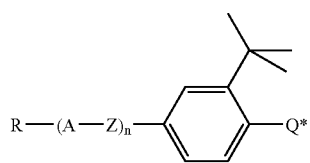
(Iab)
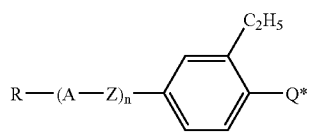
(Iac)
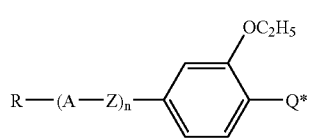
(Iad)
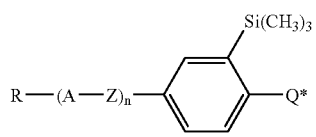
(Iae)
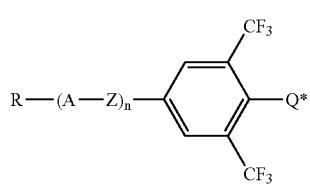
(Iaf)
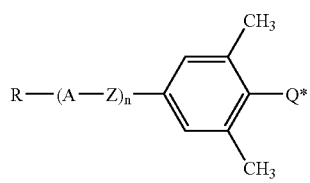
(Iag)
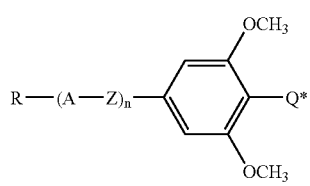
(Iah)
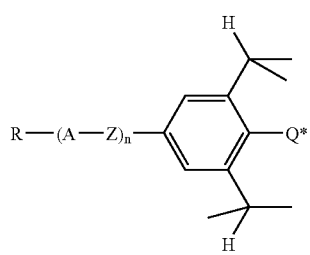
(Iai)
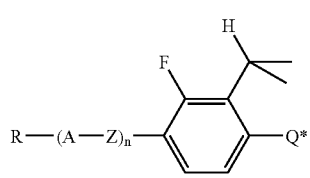
(Iba)
-continued
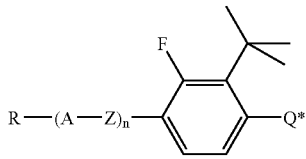
(Ibb)
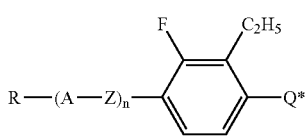
(Ibc)
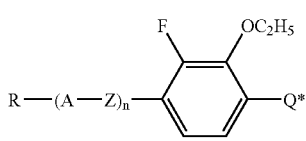
(Ibd)
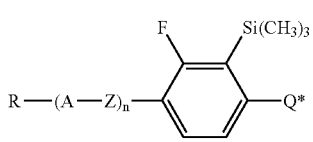
(Ibe)
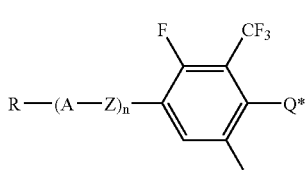
(Ibf)
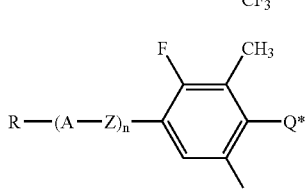
(Ibg)
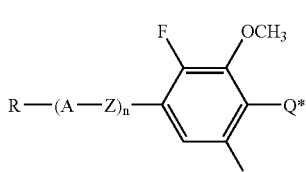
(Ibh)
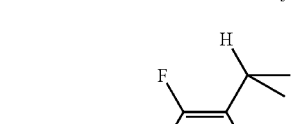
(Ibi)
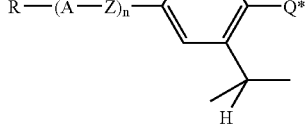
(Ica)

-continued
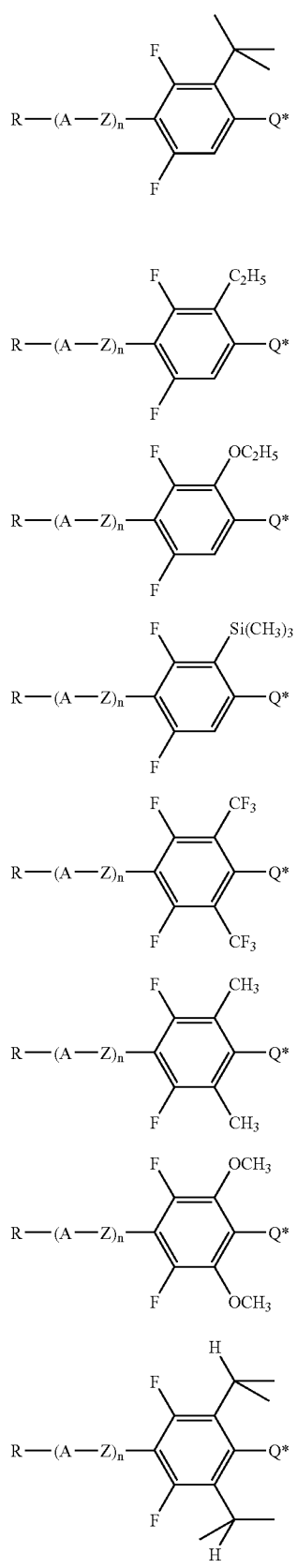
(Icb)
(Icc)
(Icd)
(Ice)
(Icf)
(Icg)
(Ich)
(Ici)
Particular preference is given to units (Iab), (Iac), (Iag) and (Ibe) mentioned.
Unit R-(A-Z)$_n$ is preferably:
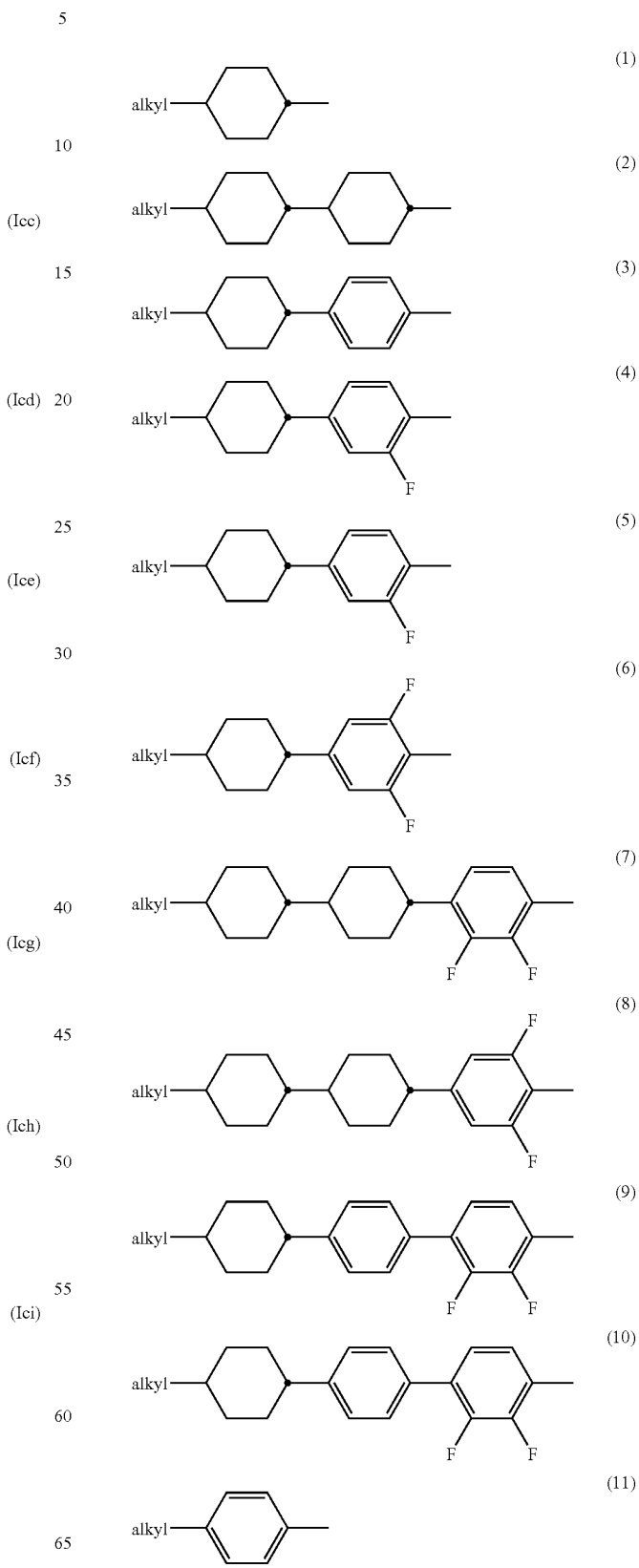

-continued
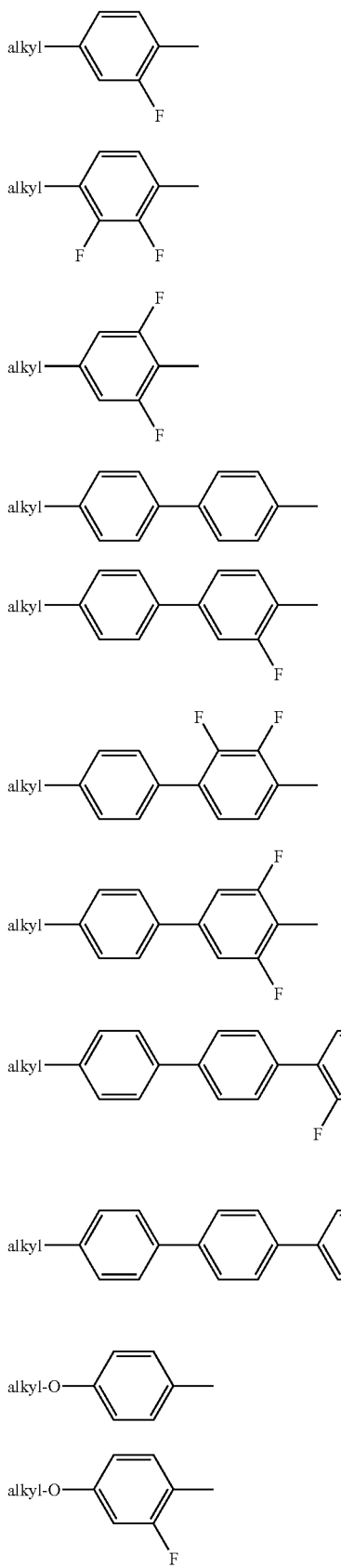
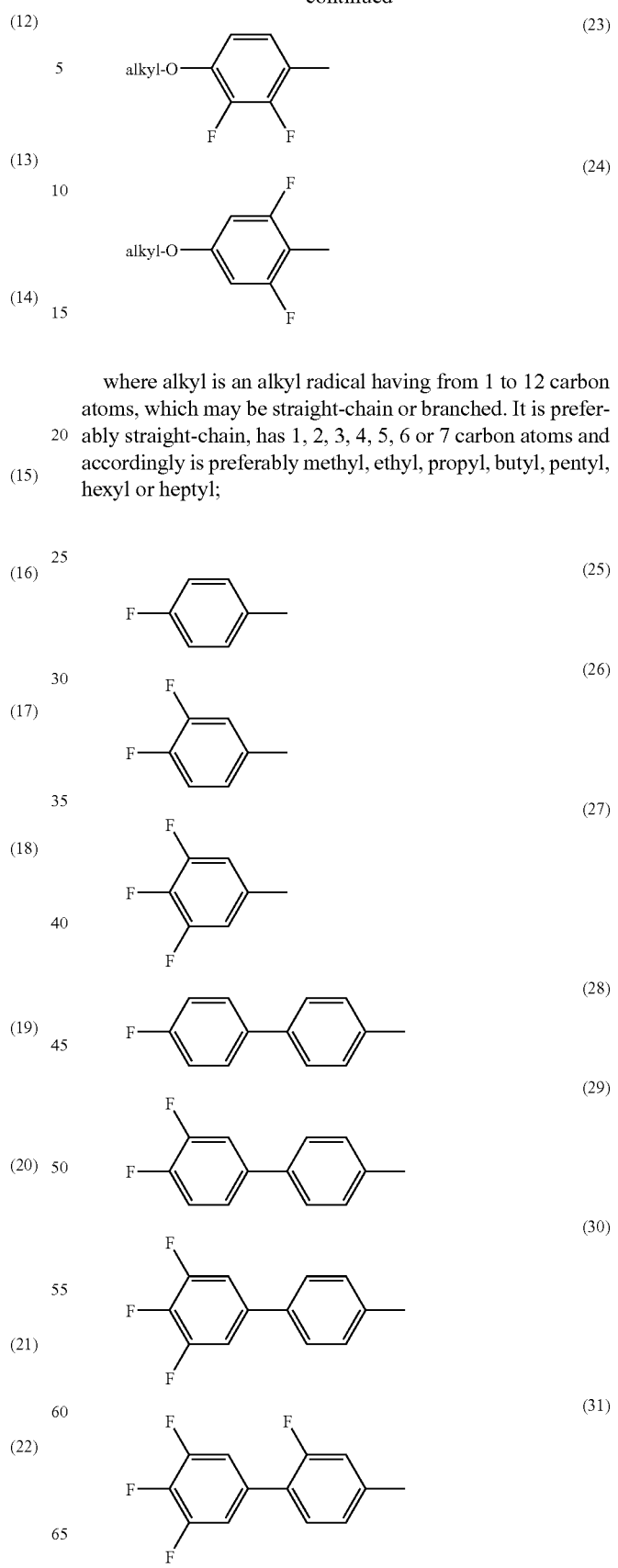
where alkyl is an alkyl radical having from 1 to 12 carbon atoms, which may be straight-chain or branched. It is preferably straight-chain, has 1, 2, 3, 4, 5, 6 or 7 carbon atoms and accordingly is preferably methyl, ethyl, propyl, butyl, pentyl, hexyl or heptyl;

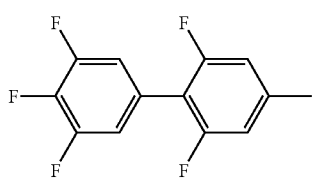
(32)

Unit R-(A-Z)$_n$ is particularly preferably groups (2) to (10), (15) to (20) and (28) to (32) mentioned and in particular groups (5), (7), (9), (17) and (19).

The chiral dopants having a laterally alkylated phenyl unit are particularly preferably the following compounds:

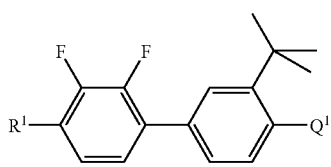
(Iab')

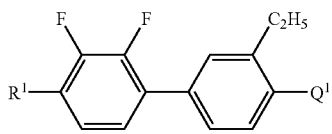
(Iac')

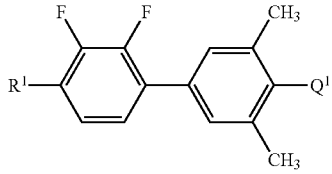
(Iag')

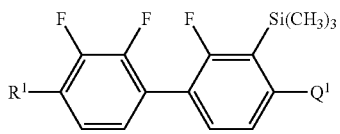
(Ibe')

where

| R$^1$ | | Q$^1$ | |
|---|---|---|---|
| alkyl—⬡— | (5') | ![structure] | (h) |
| alkyl—⬡—⬡— | (7') | ![structure] | (h) |
| alkyl—⬡—⬢— | (9') | ![structure] | (h) |
| alkyl—⬢— | (17') | ![structure] | (h) |
| alkyl—⬢—⬢— | (19') | ![structure] | (h) |
| alkyl—⬡— | (5') | ![structure] | (i) |
| alkyl—⬡—⬡— | (7') | ![structure] | (i) |
| alkyl—⬡—⬢— | (9') | ![structure] | (i) |

-continued

| R¹ | | Q¹ | |
|---|---|---|---|
| alkyl-〈phenyl〉- | (17') | H₃C-C*(H)(CH₂CH₃)-propyl | (i) |
| alkyl-〈biphenyl〉- | (19') | H₃C-C*(H)(CH₂CH₃)-propyl | (i) |
| alkyl-〈cyclohexyl〉- | (5') | —O-C*(H)(CH₃)-C₆H₁₃ | (m) |
| alkyl-〈bicyclohexyl〉- | (7') | —O-C*(H)(CH₃)-C₆H₁₃ | (m) |
| alkyl-〈cyclohexyl-phenyl〉- | (9') | —O-C*(H)(CH₃)-C₆H₁₃ | (m) |
| alkyl-〈phenyl〉- | (17') | —O-C*(H)(CH₃)-C₆H₁₃ | (m) |
| alkyl-〈biphenyl〉- | (19') | —O-C*(H)(CH₃)-C₆H₁₃ | (m) |
| alkyl-〈cyclohexyl〉- | (5') | —O-CH₂-C*(H)(CH₃)-C₂H₅ | (r) |
| alkyl-〈bicyclohexyl〉- | (7') | —O-CH₂-C*(H)(CH₃)-C₂H₅ | (r) |
| alkyl-〈cyclohexyl-phenyl〉- | (9') | —O-CH₂-C*(H)(CH₃)-C₂H₅ | (r) |
| alkyl-〈phenyl〉- | (17') | —O-CH₂-C*(H)(CH₃)-C₂H₅ | (r) |
| alkyl-〈biphenyl〉- | (19') | —O-CH₂-C*(H)(CH₃)-C₂H₅ | (r) |
| alkyl-〈cyclohexyl〉- | (5') | CH₃O-C*(H)(CH₃)-C₂H₅ | (s) |

-continued

| R¹ | | Q¹ | |
|---|---|---|---|
| alkyl—⬡—⬡— | (7') | 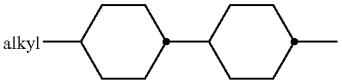 | (s) |
| alkyl—⬡—⬢— | (9') | 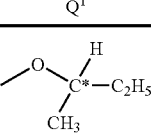 | (s) |
| alkyl—⬢— | (17') | 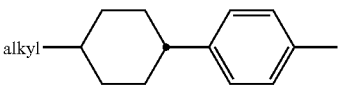 | (s) |
| alkyl—⬢—⬢— | (19') |  | (s) | where alkyl is a straight-chain alkyl radical having from 1 to 7 carbon atoms and accordingly is methyl, ethyl, propyl, butyl, pentyl, hexyl or heptyl, particularly preferably propyl.

V, W, X and Y in the general formula I may each, independently of one another, be an alkyl radical and/or an alkoxy radical having from 1 to 12 carbon atoms, which may be straight-chain or branched. It is preferably straight-chain, has 1, 2, 3, 4, 5, 6 or 7 carbon atoms and accordingly is preferably methyl, ethyl, propyl, butyl, pentyl, hexyl, heptyl, methoxy, ethoxy, propoxy, butoxy, pentoxy, hexoxy or heptoxy.

The compounds of the formula I are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The particularly preferred compounds of the formula (Iag) in which Q* is the preferred structure (m) and R-(A-Z)$_n$- is the preferred structure (3) are prepared as shown in scheme 1:

Scheme 1

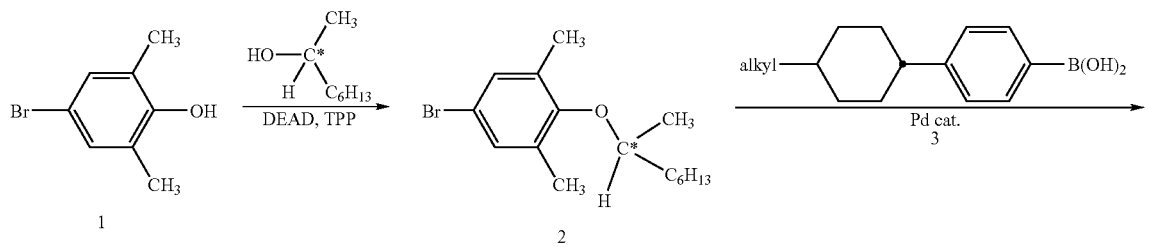

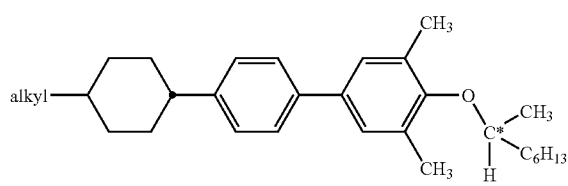

The particularly preferred compounds of the formula (Iab) in which Q* is the preferred structure (m) and R-(A-Z)$_n$- is the preferred structure (1) are prepared as shown in scheme 2:

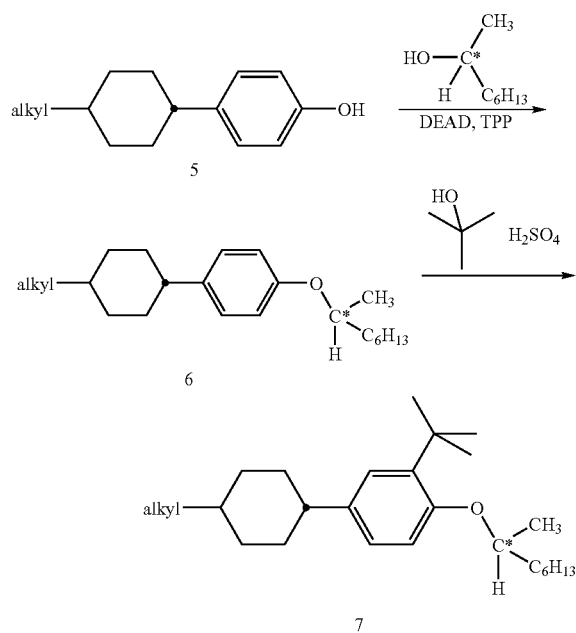

Scheme 2

The compounds of the formula I are used as components of liquid-crystalline phases, preferably nematic, liquid-crystalline phases, for example for preventing reverse twist.

The compounds of the formula I are particularly preferably employed as dopants for nematic, liquid-crystalline phases for STN and active-matrix displays. They are particularly distinguished here by a high helical twisting power (HTP) and by high voltage holding ratios. In particular, doped nematic mixtures of this type can easily be purified by treatment with aluminium oxide, with no or virtually no loss of chiral dopant occurring.

Furthermore, the chiral derivatives according to the invention can be used to prepare liquid-crystalline media for so-called "phase change" displays (for example Y. Yabe et al., SID 1991 Digest 261-264).

The present invention thus furthermore also relates to the use of the chiral dopants according to the invention in liquid-crystalline mixtures, preferably for producing twist.

The present invention thus likewise relates to liquid-crystalline mixtures comprising at least one chiral dopant of the formula I according to the invention.

The liquid-crystalline mixtures according to the invention comprise from about 0.01 to 30% by weight, preferably from 0.05 to 10% by weight, particularly preferably from 0.1 to 10% by weight and in particular from 0.1 to 5% by weight, of one or more compounds of the formula I.

The most important compounds suitable as further constituents of media according to the invention can be characterised by the formula 1, 2, 3, 4 and 5:

R'-L-E-R"      1

R'-L-COO-E-R"      2

R'-L-OOC-E-R"      3

R'-L-CH$_2$CH$_2$-E-R"      4

R'-L-C≡C-E-R"      5

In the formula 1, 2, 3, 4 and 5, L and E, which may be identical or different, are each, independently of one another, a divalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and G is 2-(trans-1,4-cyclohexyl)ethyl.

One of the radicals L and E is preferably Cyc, Phe or Pyr. E is preferably Cyc, Phe or Phe-Cyc. The media according to the invention preferably comprise one or more components selected from the compounds of the formula 1, 2, 3, 4 and 5 in which L and E are selected from the group consisting of Cyc, Phe and Pyr and simultaneously one or more components selected from the compounds of the formula 1, 2, 3, 4 and 5 in which one of the radicals L and E is selected from the group consisting of Cyc, Phe and Pyr and the other radical is selected from the group consisting of -Phe-Phe-, -Phe-Cyc-, -Cyc-Cyc-, -G-Phe- and -G-Cyc-, and optionally one or more components selected from the compounds of the formula 1, 2, 3, 4 and 5 in which the radicals L and E are selected from the group consisting of -Phe-Cyc-, -Cyc-Cyc-, -G-Phe- and -G-Cyc-.

R' and/or R" are each, independently of one another, alkyl, alkenyl, alkoxy, alkoxyalkyl, alkenyloxy or alkanoyloxy having up to 8 carbon atoms, —F, —Cl, —CN, —NCS or —(O)$_i$CH$_{3-(k+l)}$F$_k$Cl$_l$, where i is 0 or 1, k and l are 1, 2 or 3 and the sum (k+l) is 1, 2 or 3.

In a smaller sub-group of the compounds of the formula 1, 2, 3, 4 and 5, R' and R" are each, independently of one another, alkyl, alkenyl, alkoxy, alkoxyalkyl, alkenyloxy or alkanoyloxy having up to 8 carbon atoms. This smaller sub-group is called group A below, and the compounds are referred to by the sub-formula 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formula 1, 2, 3, 4 and 5, which is known as group B, R" is —F, —Cl, —NCS or —(O)$_i$CH$_{3-(k+l)}$F$_k$Cl$_l$, where i is 0 or 1, k and l are 1, 2 or 3 and the sum (k+l) is 1, 2 or 3, the compounds in which R" has this meaning are referred to by the sub-formula 1b, 2b, 3b, 4b and 5b. Particular preference is given to those compounds of the sub-formula 1b, 2b, 3b, 4b and 5b in which R" is —F, —Cl, —NCS, —CF$_3$, —OCHF$_2$ or —OCF$_3$.

In the compounds of the sub-formula 1b, 2b, 3b, 4b and 5b, R' is as defined for the compounds of the sub-formula 1a to 5a and is preferably alkyl, alkenyl, alkoxy or alkoxyalkyl.

In a further smaller sub-group of the compounds of the formula 1, 2, 3, 4 and 5, R" is —CN; this sub-group is referred to below as group C, and the compounds of this sub-group are correspondingly described by sub-formula 1c, 2c, 3c, 4c and 5c. In the compounds of the sub-formula 1c, 2c, 3c, 4c and 5c, R' is as defined for the compounds of the sub-formula 1a to 5a and is preferably alkyl, alkoxy or alkenyl.

Besides the preferred compounds of groups A, B and C, other compounds of the formula 1, 2, 3, 4 and 5 having other variants of the proposed substituents are also customary. All these substances are obtainable by methods which are known from the literature or analogously thereto.

Preference is given to liquid-crystalline mixtures comprising at least one chiral dopant of the formula I according to the invention and at least one liquid-crystalline compound of the formula 1, 2, 3, 4 and/or 5.

Besides compounds of the formula I according to the invention, the media according to the invention particularly preferably comprise one or more compounds selected from groups A, B and/or C.

The proportions by weight of the compounds from these groups in the media according to the invention are preferably group A: from 0 to 90%, preferably from 20 to 90%, in particular from 30 to 90% group B: from 0 to 80%, preferably from 10 to 80%, in particular from 10 to 65% group C: from 0 to 80%, preferably from 5 to 80%, in particular from 5 to 50%, where the sum of the proportions by weight of the group A and/or B and/or C compounds present in the respective media according to the invention are preferably from 5% to 90% and particularly preferably from 10% to 90%.

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example by using premixes, for example homologue mixtures, or using so-called "multi-bottle" systems.

The dielectrics may also comprise further additives known to the person skilled in the art and described in the literature. For example, 0-15%, preferably 0-10%, of pleochroic dyes and/or chiral dopants can be added. The individual compounds added are employed in concentrations of from 0.01 to 6%, preferably from 0.1 to 3%. However, the concentration data for the other constituents of the liquid-crystal mixtures, i.e. of the liquid-crystalline or mesogenic compounds, are indicated without taking into account the concentration of these additives.

The present invention furthermore relates to electro-optical display elements, in particular liquid-crystal, switching and display devices, containing a liquid-crystalline medium, outer plates, electrodes, at least one alignment layer and optionally additional auxiliary layers, where the liquid-crystalline medium comprises at least one compound of the formula I.

The present invention furthermore relates to electro-optical display elements with active-matrix addressing, having nematic or cholesteric phases which comprise at least one compound of the formula I.

In the present application and in particular in the examples below, the structures of the liquid-crystal compounds are indicated by means of acronyms, the transformation into chemical formula taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | F | H |
| nN•F•F | $C_nH_{2n+1}$ | CN | F | F |
| nF | $C_nH_{2n+1}$ | F | H | H |
| nF•F | $C_nH_{2n+1}$ | F | F | H |
| nF•F•F | $C_nH_{2n+1}$ | F | F | F |
| nOF | $OC_nH_{2n+1}$ | F | H | H |
| nCl | $C_nH_{2n+1}$ | Cl | H | H |
| nCl•F | $C_nH_{2n+1}$ | Cl | F | H |
| nCl•F•F | $C_nH_{2n+1}$ | Cl | F | F |
| nCF$_3$ | $C_nH_{2n+1}$ | CF$_3$ | H | H |
| nCF$_3$•F | $C_nH_{2n+1}$ | CF$_3$ | F | H |
| nCF$_3$•F•F | $C_nH_{2n+1}$ | CF$_3$ | F | F |
| nOCF$_3$ | $C_nH_{2n+1}$ | OCF$_3$ | H | H |
| nOCF$_3$•F | $C_nH_{2n+1}$ | OCF$_3$ | F | H |
| nOCF$_3$•F•F | $C_nH_{2n+1}$ | OCF$_3$ | F | F |
| nOCF$_2$ | $C_nH_{2n+1}$ | OCHF$_2$ | H | H |
| nOCF$_2$•F | $C_nH_{2n+1}$ | OCHF$_2$ | F | H |
| nOCF$_2$•F•F | $C_nH_{2n+1}$ | OCHF$_2$ | F | F |
| nS | $C_nH_{2n+1}$ | NCS | H | H |
| nS•F | $C_nH_{2n+1}$ | NCS | F | H |
| nS•F•F | $C_nH_{2n+1}$ | NCS | F | F |
| rVsN | $C_rH_{2r+1}$—CH=CH—$C_sH_{2s}$ | CN | H | H |
| rEsN | $C_rH_{2r+1}$—O—$C_sH_{2s}$ | CN | H | H |
| nAm | $C_nH_{2n+1}$ | $COOC_mH_{2m+1}$ | H | H |

TABLE A

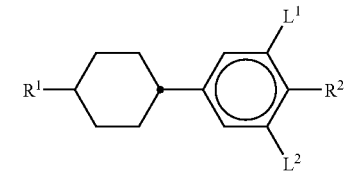

PCH

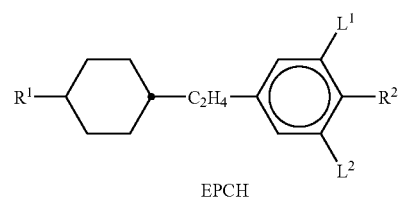

EPCH

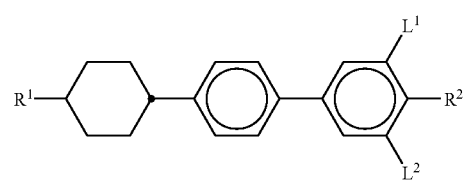

BCH

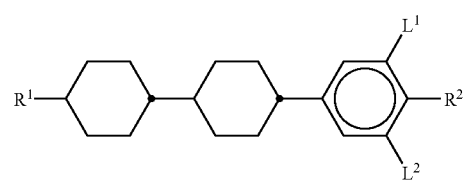

CCP

TABLE A-continued
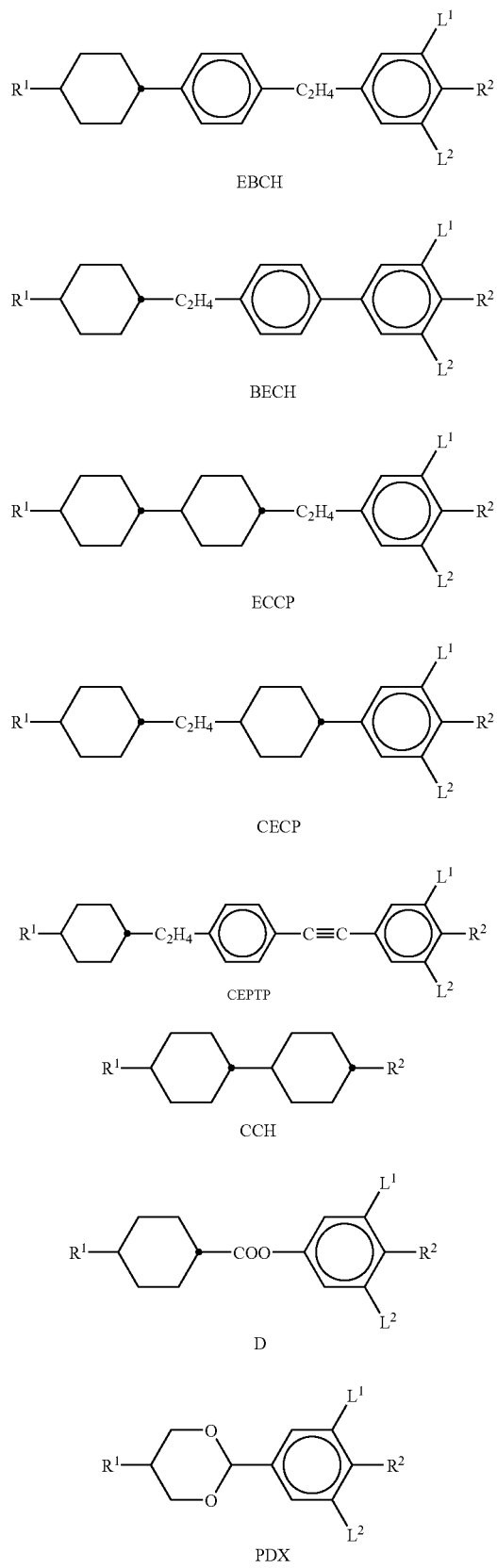
TABLE A-continued
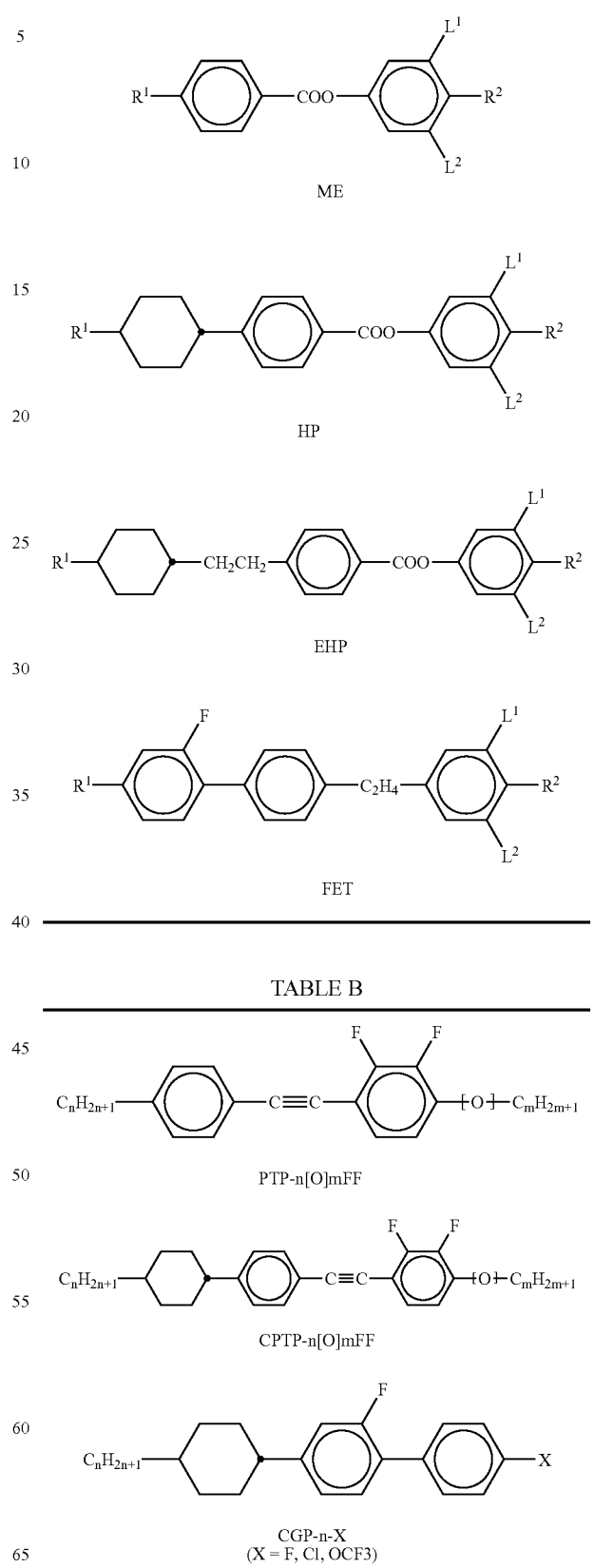

TABLE B-continued
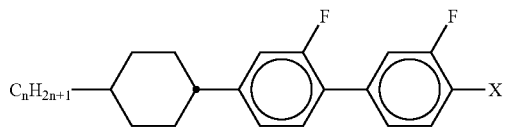
CGG-n-X
(X = F, Cl, OCF3)
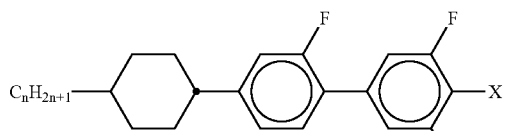
CGU-n-X
(X = F, Cl, OCF3)
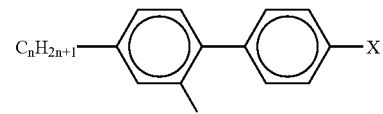
GP-n-X
(X = F, Cl, OCF3)
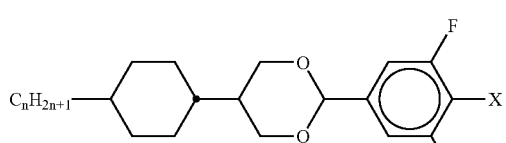
CDU-n-X
(X = F, Cl, OCF3)
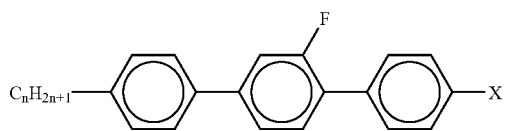
PGP-n-X
(X = F, Cl, OCF3)
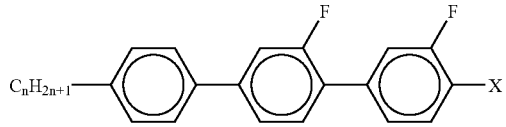
PGG-n-X
(X = F, Cl, OCF3)
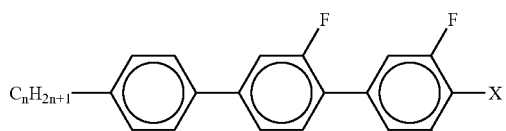
PGU-n-X
(X = F, Cl, OCF3)
TABLE B-continued
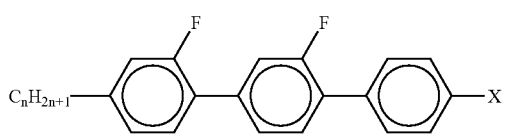
GGP-n-X
(X = F, Cl, OCF3)
PGIGI-n-X
(X = F, Cl, OCF3)
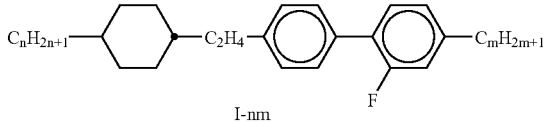
I-nm
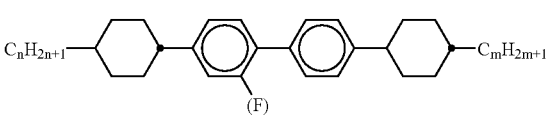
CBC-nm(F)
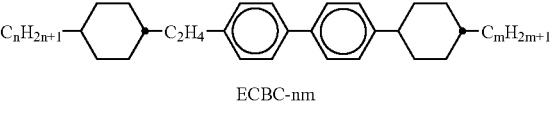
ECBC-nm
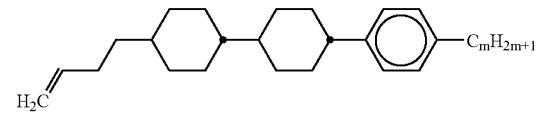
CCP-V2-m
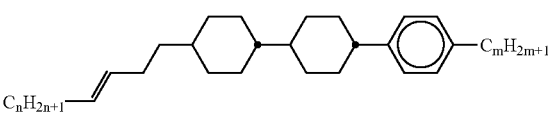
CCP-nV2-m
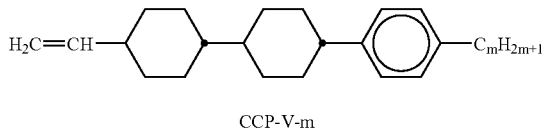
CCP-V-m
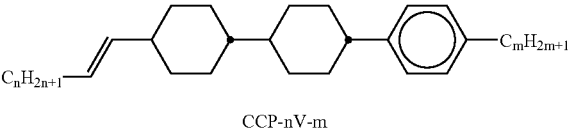
CCP-nV-m

TABLE B-continued

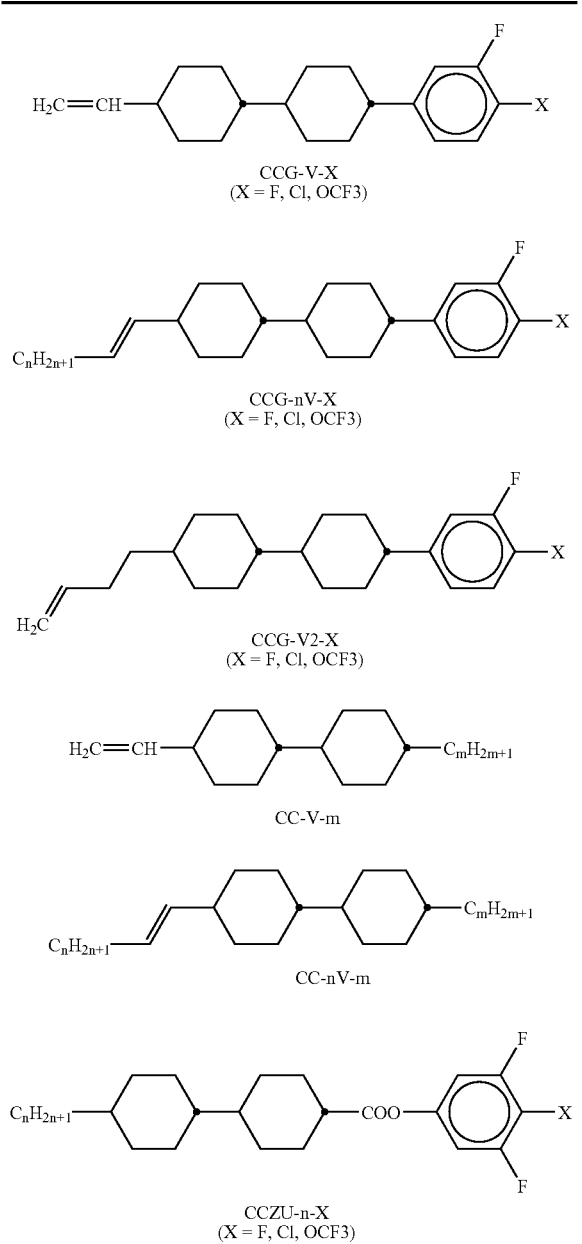

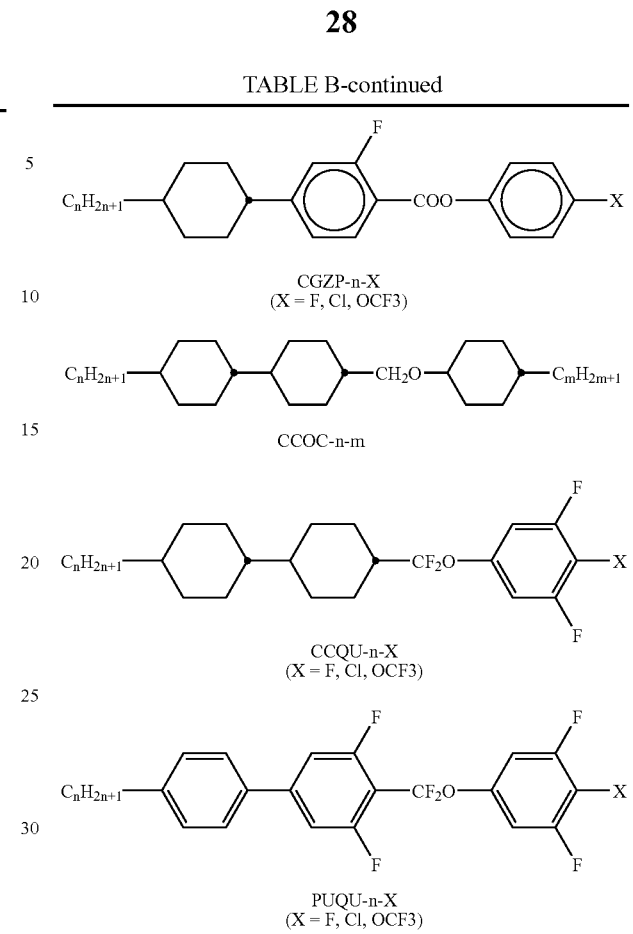

The invention is explained in greater detail below with reference to working examples, but without being restricted thereby in any way.

EXAMPLE 1

5.0 g (24.9 mmol) of 4-bromo-2,6-dimethylphenol 1, 5.0 ml of 2-octanol (31.5 mmol) and 8.0 g of triphenylphosphine (TPP) (30.5 mmol) are dissolved in 200 ml of tetrahydrofuran (THF) at room temperature with stirring (yellow coloration). 6.0 ml (30.9 mmol) of diisopropyl azo-dicarboxylate (DEAD) are subsequently added dropwise. Owing to the exothermic reaction, the temperature rises to 35° C. In order to achieve complete conversion, the mixture is stirred for a further 2 hours. The batch is evaporated to dryness in a rotary evaporator, and the resultant crude product is eluted with 1-chlorobutane over 1 l of silica gel, giving product 2.

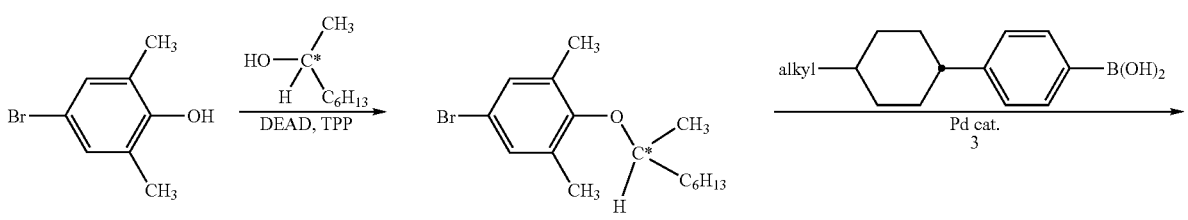

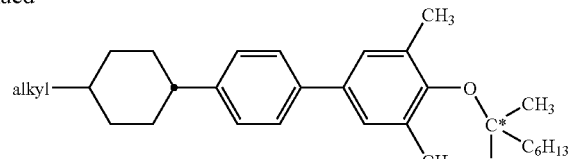

4

7.1 g of product 2 (22.7 mmol), 6.0 g of compound 3 (24.4 mmol), 0.020 g of palladium(II) acetate (47% of Pd) (0.089 mmol), 0.06 g of triphenylphosphine (0.229 mmol), 50 ml of propanol, 15.0 ml of 2N sodium carbonate solution and 10 ml of water are combined and refluxed overnight at 80° C. The reaction mixture is subsequently diluted with water, MTB ether (tert-butyl methyl ether) is added, and the organic phase is separated off. The aqueous phase is extracted twice with MTB ether. The combined organic phases are washed with water and with $NH_4Cl$ solution, dried, filtered with suction and evaporated, giving 10.6 g of a black oil, which is eluted with 1-chlorobutane over 1 l of silica gel. This results in 10 g of a clear oil, which is eluted with 1-chlorobutane/heptane over 3 l of silica gel, giving a viscous, clear liquid, which is recrystallised from 1:25 i-propanol at −5° C., giving product 4 as a highly viscous liquid.

EXAMPLE 2

20.0 g of product 5 (91.6 mmol), 15.28 ml of 2-octanol (96.18 mmol) and 25.23 g of triphenylphosphine (96.18 mmol) are dissolved in 220 ml of tetrahydrofuran (THF) under a nitrogen atmosphere at room temperature with stirring (yellow coloration). 19.45 g of diisopropyl azodicarboxylate (DEAD) (96.18 mmol) are subsequently added dropwise. Owing to the exothermic reaction, the temperature rises to 51° C. In order to achieve the most complete conversion possible, the batch is stirred overnight at room temperature. The batch is then evaporated to dryness in a rotary evaporator, and the resultant crude product is eluted with heptane/dichloromethane (1:1) over 2 l of silica gel, giving product 6.

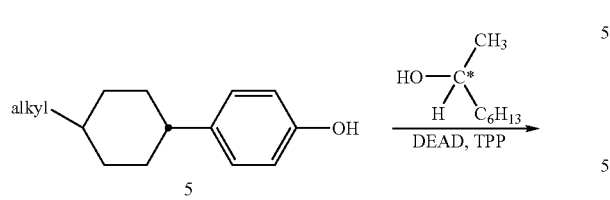

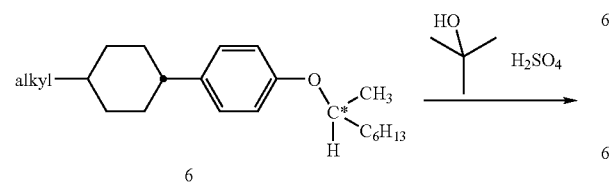

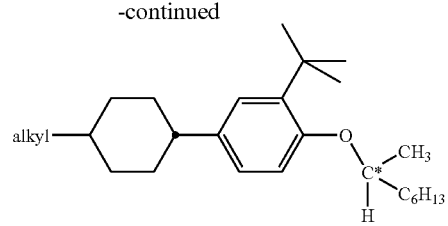

7

5.0 g of product 6 (15.04 mmol) are dissolved in 2.86 g of tert-butanol (30.07 mmol) and introduced with vigorous stirring into 9.62 ml of 95 to 97% sulfuric acid (180.42 mmol). After the reaction mixture has been stirred for 30 minutes, a lot of water is added, and the mixture is extracted twice with MTB ether. The combined organic phases are washed with water, dried over sodium sulfate, filtered and evaporated in a rotary evaporator, giving the crude product, which is eluted twice with heptane over 1 l of silica gel, giving product 7.

EXAMPLE 3

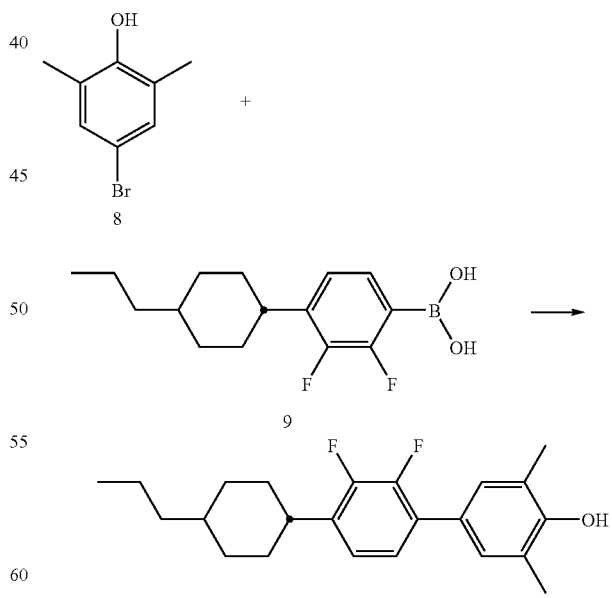

10.104 g of 4-bromo-2,6-dimethylphenol 8 (50.0 mmol), 17.211 g of product 9 (61.0 mmol), 100.51 ml of 1,4-dioxane, 1.513 g of bis(tricyclo-hexylphosphanyl)Pd(II) chloride (2.05 mmol) and 30.161 g of tripotassium phosphate trihydrate (113.25 mmol) are combined and stirred overnight at 80° C. to complete conversion. The reaction mixture is subsequently cooled to room temperature, water is added, the mixture is acidified using semi-conc. HCl and extracted with MTB ether. The green suspension is filtered through Celite® with suction, and the phases are separated. The aqueous phase is extracted 2× with MTB ether, and the combined organic phases are washed 1× with water and 1× with saturated NaCl solution, dried over sodium sulfate, filtered with suction and evaporated, giving 24 g of a dark greenish-brown greasy residue, which is eluted with 1-chlorobutane over 0.7 l of silica gel, giving 10 g of a yellowish-brown, crystalline material, which is recrystallised from four times the amount of methanol, at −15° C., giving pale-violet crystals of compound 10.

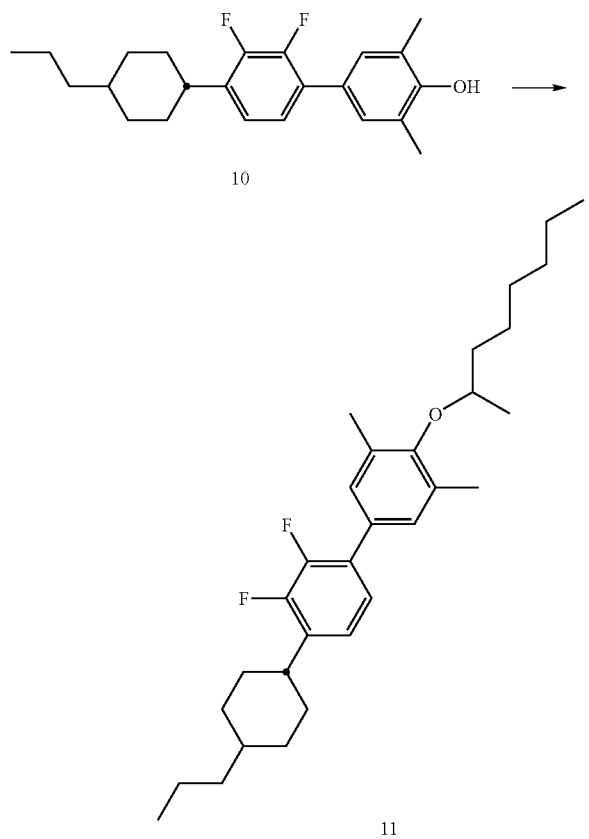

2.168 g of compound 10 (6.0 mmol), 1.206 ml of 2-octanol (7.596 mmol), 1.936 g of triphenylphosphine (7.38 mmol) and 20 ml of tetrahydrofuran (THF) are dissolved under a nitrogen atmosphere at room temperature with stirring (yellow coloration), and 1.447 ml of diisopropyl azodicarboxylate (7.44 mmol) are subsequently added dropwise. Owing to the exothermic reaction, the temperature rises to 35° C. In order to achieve complete conversion, the batch is stirred for a further 2 hours. The batch is subsequently evaporated to dryness in a rotary evaporator, giving 7.0 g of a yellowish, viscous, virtually clear residue, which is eluted with 1-chlorobutane over 1 l of silica gel, giving 1.9 g of a colourless, clear and viscous liquid, which is again eluted with 1-chlorobutane over silica gel, giving product 11.

EXAMPLE 4

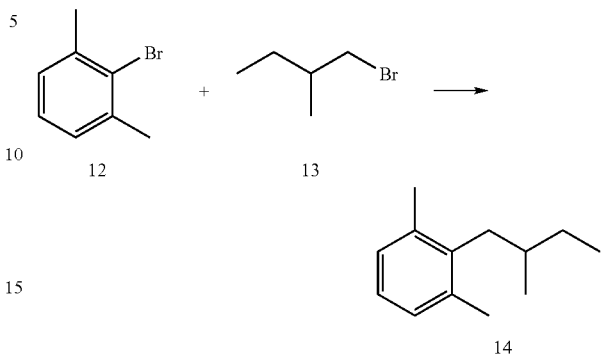

4.11 g of magnesium turnings (169.044 mmol) are initially introduced in 70 ml of THF, the mixture is heated to reflux, and a solution of 18.6 g of 1-bromo-2-methylbutane 13 (121.907 mmol) in 150 ml of THF is added dropwise at such a rate that the mixture constantly refluxes (without a heating bath). The mixture is subsequently stirred under reflux for a further 1 hour, cooled to 17° C. (a milky grey suspension forms), 27.451 g of zinc bromide in 120 ml of THF are added dropwise up to about 37° C., during which a white, crystalline crystal slurry forms temporarily at the flask rim, 2.087 g of palladium bis(diphenylphosphino)ferrocene (2.844 mmol) are subsequently added (purple coloration), and 16.0 g of 1-bromo-2,6-dimethylbenzene 12 (81.271 mmol) in 120 ml of THF are added dropwise, during which the reaction mixture becomes a brownish colour and during which the temperature gradually rises to 37° C. and the reaction mixture is refluxed using a heating bath. The suspension is refluxed with stirring overnight (22 hours).

After 24 hours, 2.2 g of tricyclohexylphosphine-Pd(II) chloride are added in the form of a 3.5 mol % solution in THF. The mixture is refluxed overnight.

After a further 24 hours, the same amount of tricyclohexylphosphine-Pd(II) chloride is again added.

After refluxing for a total of 68 hours, the reaction mixture is allowed to cool, about 400 ml of water are added, and the mixture is extracted with about 6×250 ml of pentane. The phases are difficult to separate since a black interphase forms. The organic phase is greenish/grey/ochre with black components.

The pentane phase is dried using sodium sulfate, and 2 spoons of silica gel are added, which prevents vigorous bumping on the frit during subsequent filtering with silica gel/pentane.

The dark pentane phase is filtered with the sodium sulfate over a 1 l frit with an approximately 6 cm thick layer of silica gel. 1 litre of pentane is used for washing. The entire, yellow pentane solution is distilled under atmospheric pressure using a column.

40 g of a yellowish-orange liquid with a yellow precipitate are obtained as residue from the distillation. This residue is eluted over silica gel/pentane. 1.5 litres of the pentane solution are distilled off under atmospheric pressure and subsequently distilled under reduced pressure.

Product 14 is obtained on vacuum distillation as a virtually colourless, slightly yellowish distillate (b.p.: 92 to 94° C., bath: 110 to 130° C., 5.3 mbar).

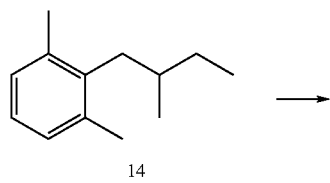

14

15

8.4 g of product 14 (45.311 mmol) are initially introduced in 50 ml of dichloromethane, giving an orange-yellowish, clear solution, and 10.213 g of silver trifluoroacetate (45.311 mmol) are added. In the process, the reaction mixture changes to a pale yellow colour, and a slightly endothermic reaction is observed. 2.321 ml of bromine (45.311 mmol) in 20 ml of dichloromethane are added dropwise to the yellow-whitish suspension over the course of half an hour at such a rate that the temperature does not exceed 30° C. (decoloration, grey-whitish suspension). The temperature rises to 29° C. The reaction mixture is a slightly yellowish suspension. After the mixture has been stirred for a further 3 hours, the AgBr is filtered off and washed with CH$_2$Cl$_2$. The dichloromethane phase is washed with water until neutral, dried using Na$_2$SO$_4$ and evaporated to dryness. Distillation in a bulb tube (155° C., 1 mbar) gives product 15 as a virtually colourless liquid.

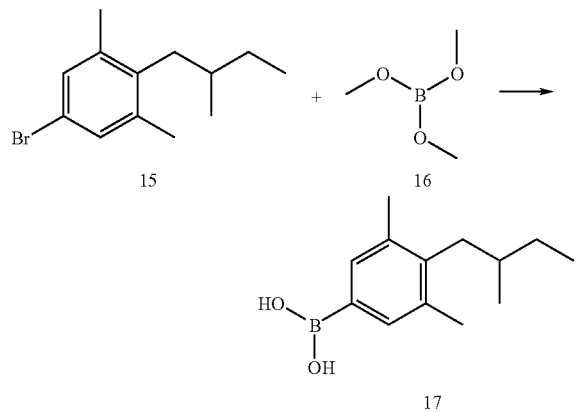

1.097 g of magnesium turnings (45.1 mmol) are initially introduced under nitrogen, covered with 10 ml of THF and subsequently heated to reflux. The reaction is initiated using 4 to 5 drops of product 15, and the remainder of the 10.4 g of product 15 (0.041 mol) is dissolved in 30 ml of THF and added dropwise, with gentle stirring, at such a rate that the reaction mixture constantly refluxes. In the process, the reaction mixture becomes a brown colour. When everything has been added dropwise, the mixture is stirred for a further 2 hours under reflux. The entire mixture is then cooled to 10° C., and 5.039 ml of trimethyl borate 16 (45.1 mmol) are added dropwise, during which a brown, glassy suspension which is difficult to stir forms. The temperature is held at between 10 and 20° C. during this process. The mixture is subsequently stirred at this temperature for a further 30 minutes. 30 ml of water are then carefully added dropwise, a white precipitate forms, and the temperature rises to 27° C. 80 ml of MTB ether are then added, and the reaction mixture is acidified using 50 ml of semi-conc. hydrochloric acid (exothermic to 29° C.) and stirred until the excess magnesium has dissolved. On acidification, the precipitate dissolves, and a pale-yellow solution forms. The aqueous phase is separated off and extracted 2× with MTB ether. The combined organic phases are washed 1× with water, dried over sodium sulfate, filtered with suction and evaporated in a rotary evaporator, giving product 17 as a yellow, clear liquid.

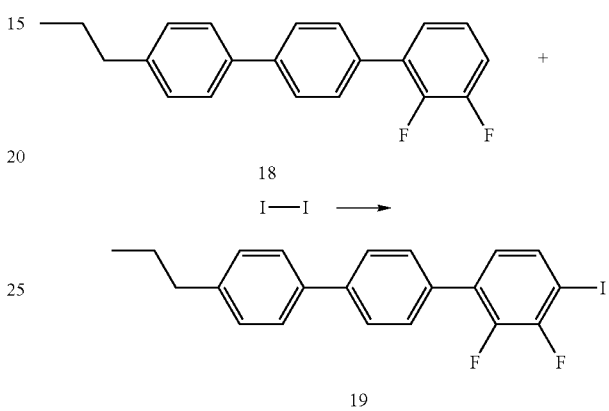

30.0 g of product 18 (0.097 mol) and 100 ml of THF are combined at room temperature and cooled to −70° C. 65.689 ml of a 15% butyllithium solution in n-hexane (107.67 mmol) are then added dropwise with stirring to the resultant white suspension at this temperature, and the mixture is subsequently stirred for approximately a further 1 hour at −70° C. 27.082 g of iodine (0.107 mol) dissolved in 50 ml of THF are subsequently added dropwise to the purple solution at −70° C. The temperature is then allowed to come to −30° C., and water is rapidly added dropwise. The excess iodine is destroyed using a sodium hydrogensulfite solution. The phases are then separated, the aqueous phase is extracted 2× with MTB ether, and the combined organic phases are washed 1× with water and 1× with saturated NaCl solution. The combined organic phases are dried over Na$_2$SO$_4$, filtered with suction and evaporated, giving product 19 as a brownish, crystalline residue, which is recrystallised from heptane.

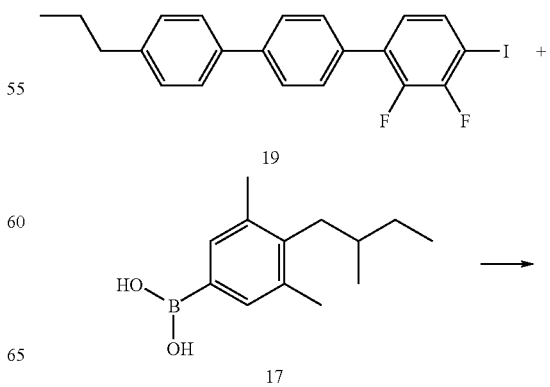

-continued

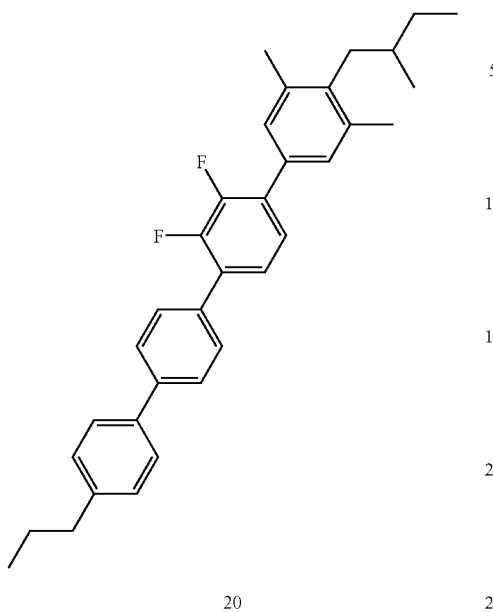

20

12.085 g of product 19 (27.8 mmol), 8.5 g of compound 17 (33.981 mmol), 150 ml of dioxane, 0.821 g of bis(tricyclophosphanyl)Pd(II) chloride (1.112 mmol) and 16.733 g of tripotassium phosphate trihydrate (62.828 mmol) are combined and stirred overnight at 80° C. to complete conversion. The reaction mixture is then cooled to room temperature, water is added, and the mixture is acidified using semi-conc. HCl and extracted with MTB ether. The green suspension is filtered through Celite® with suction, and the phases are separated. The aqueous phase is extracted 2× with MTB ether, and the combined organic phases are washed 2× with water and saturated NaCl solution, dried over sodium sulfate, filtered with suction and evaporated, giving 16.0 g of a dark orange-brown, viscous material, which is eluted over silica gel/heptane, giving 6.0 g of a yellow, clear solution, which is eluted over a small amount of silica gel/heptane, giving a virtually colourless, slightly yellowish, smectic mass of compound 20.

EXAMPLE 5

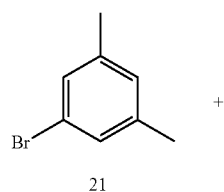

21

-continued

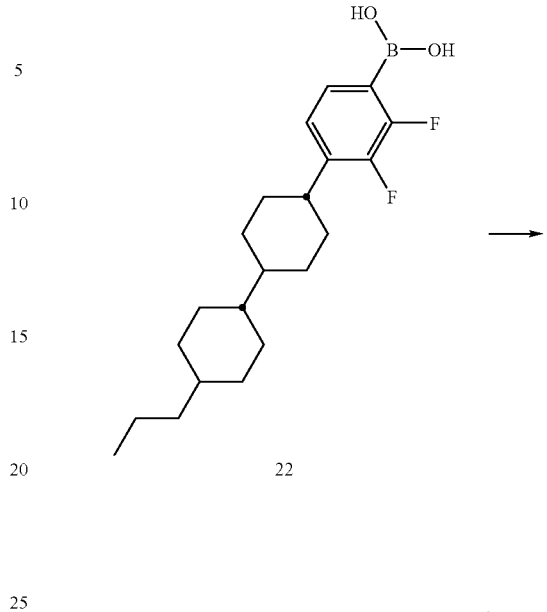

7.419 g of sodium metaborate octahydrate (26.64 mmol) are initially introduced in 12.6 ml of water, 0.623 g of bis(triphenylphosphine)Pd(II) chloride (0.888 mmol), 0.043 ml of hydrazinium hydroxide (0.8.88 mmol) and 4.928 ml of 5-bromo-m-xylene 21 (35.52 mmol) and 30 ml of THF are added, and the mixture is stirred for 5 minutes, then 14.393 g of product 22 (39.512 mmol), dissolved in 100 ml of THF, are added, and the mixture is heated to the boiling point (65° C.) and refluxed overnight to complete conversion. The reaction mixture is then cooled, water and MTB ether are added, and the phases are separated. The aqueous phase is extracted 2× with MTB ether, and the combined organic phases are washed 3× with water, dried over sodium sulfate, filtered with suction and evaporated. The resultant crude product is eluted with pentane over 1.2l of silica gel, and the corresponding fractions are combined and evaporated in a rotary evaporator, giving product 23 as a white, crystalline material, which is recrystallised from 12 times the amount of i-propanol at +4° C.

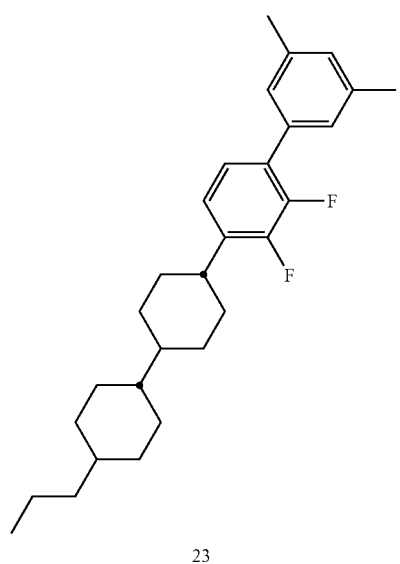

23

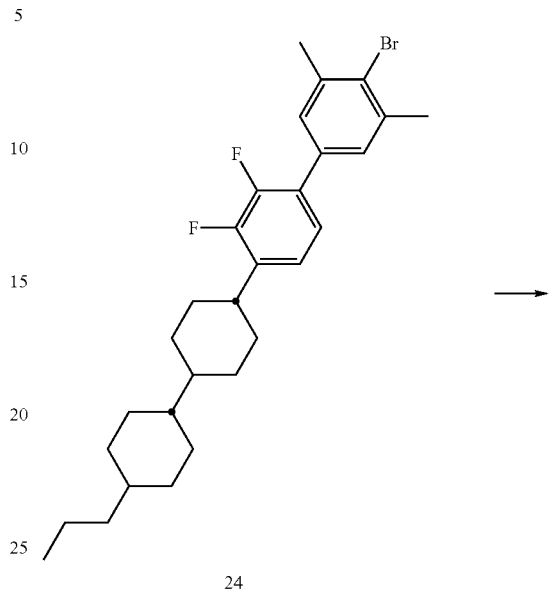

The product is subsequently eluted firstly with heptane at 50° C. and then with pentane over silica gel. The resultant product 24 is recrystallised from pentane.

24

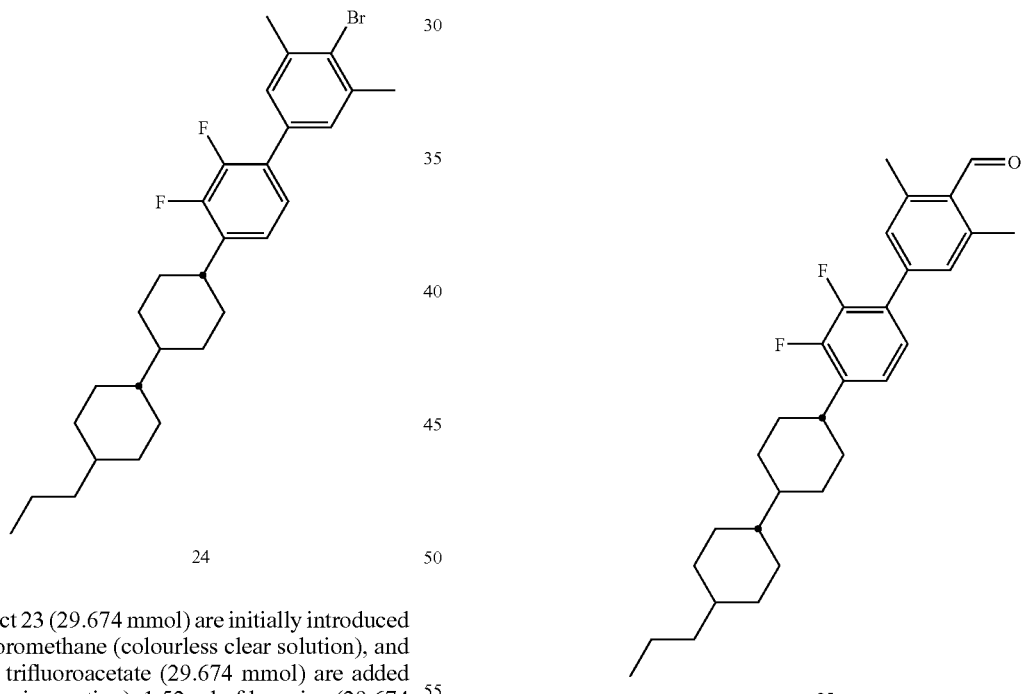

24

25

12.6 g of product 23 (29.674 mmol) are initially introduced in 30 ml of dichloromethane (colourless clear solution), and 6.688 g of silver trifluoroacetate (29.674 mmol) are added (slightly endothermic reaction). 1.52 ml of bromine (29.674 mmol) in 10 ml of dichloromethane are added dropwise to the whitish suspension over the course of half an hour at such a rate that the temperature does not exceed 40° C. (decoloration). The temperature rises to 34° C. The reaction mixture is then a slightly yellowish suspension. After the mixture has been stirred for a further 3 hours, the AgBr is allowed to settle and is filtered off next day and washed with $CH_2Cl_2$. The solution is then evaporated to dryness. It is attempted to dissolve the resultant white, crystalline material in 200 ml of pentane. The insoluble crystals are filtered off, washed with pentane and subsequently recrystallised from pentane at 5° C.

3.031 g of product 24 (5.839 mmol) are initially introduced in 50 ml of diethyl ether. 4.007 ml of a 15% butyllithium solution in hexane (6.38 mmol) are added dropwise at 0° C. The mixture is stirred at this temperature for a further 1 hour, and then 0.708 ml of N-formylpiperidine (6.38 mmol) is added dropwise. The mixture is again stirred for a further 1 hour, then stirred overnight at room temperature. Water is subsequently added rapidly, and the mixture is extracted with MTB ether. The resultant product 25 is eluted over silica gel/chlorobutane and recrystallised from heptane 1:10.

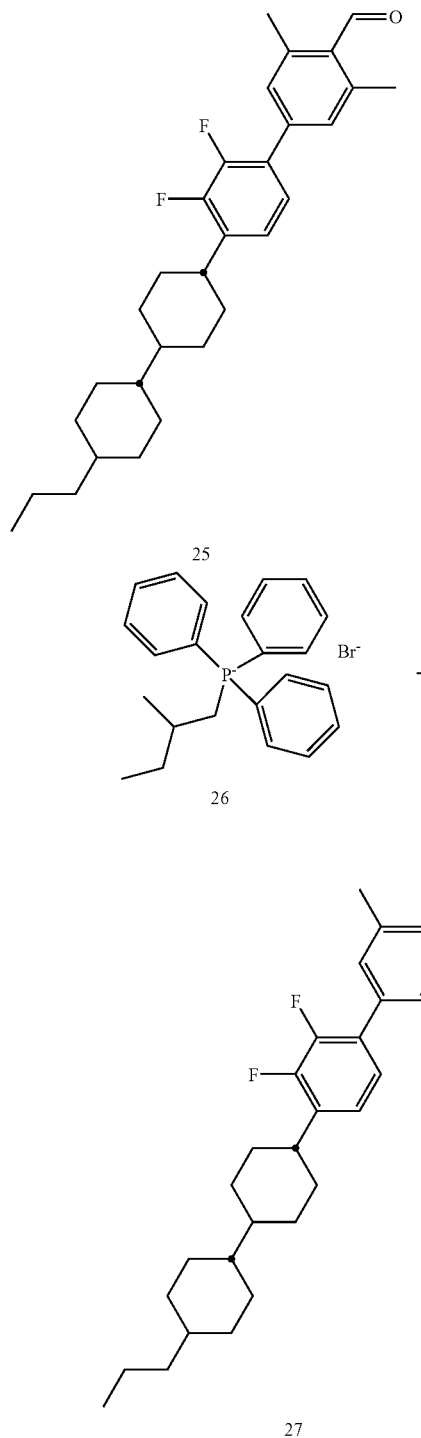

1.401 g of product 26 (3.39 mmol) are suspended in 20 ml of THF (white) and cooled to from 0 to 5° C. 2.966 ml of a 2 molar solution of lithium diisopropylamide in cyclohexane/ethylbenzene/THF (3.6 mmol) are added dropwise at this temperature, during which the colour gradually changes to yellow-orange. The solution of 1.5 g of product 25 (0.003 mol) in 20 ml of THF is subsequently added dropwise at from 0 to 5° C., and the temperature is then allowed to come to room temperature. After the reaction mixture has been stirred for a further 2 hours, water and semi-conc. HCl are added (slightly exothermic), the mixture is extracted with MTB ether, and the phases are separated. The aqueous phase is then extracted 2× with MTB ether, and the combined organic phases are washed 1× with water and 1× with saturated NaCl solution, dried over sodium sulfate, filtered with suction and evaporated, giving product 27 as a yellow, crystalline residue, which is eluted with heptane over silica gel.

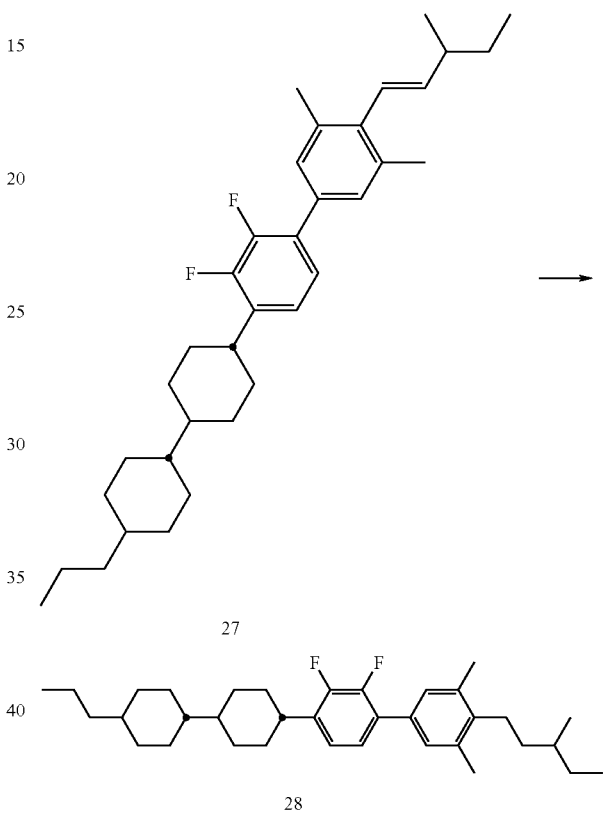

1.10 g of product 27 (2.088 mmol) are initially introduced in 50 ml of THF and hydrogenated to completion using 1.0 g of a Pd/C catalyst and 46.7 ml of hydrogen. Product 28 forms as a crystalline residue, which is eluted with pentane over silica gel and subsequently recrystallised from 10 times the amount of i-propanol.

EXAMPLE 6

To a liquid-crystalline base mixture of the following composition:

| | |
|---|---|
| PCH-5F | 10.0 |
| PCH-6F | 8.0 |
| PCH-7F | 6.0 |
| CCP-2OCF3 | 8.0 |
| CCP-3OCF3 | 12.0 |
| CCP-4OCF3 | 7.0 |
| CCP-5OCF3 | 11.0 |

-continued

| | |
|---|---|
| BCH-3F•F | 12.0 |
| BCH-5F•F | 10.0 |
| ECCP-3OCF3 | 5.0 |
| ECCP-5OCF3 | 5.0 |
| CBC-33F | 2.0 |
| CBC-52F | 2.0 |
| CBC-55F | 2.0 | is added 1.0% by weight of product 4 from Example 1, and the helical twisting power HTP of the composition is determined at 20° C. It has a helical twisting power HTP of −15.4.

By comparison, the corresponding compound which is substituted by fluorine atoms instead of the two methyl groups only gives a helical twisting power HTP of −9.37.

EXAMPLE 7

1.0% by weight of product 7 from Example 2 is added to the liquid-crystalline base mixture from Example 6, and the helical twisting power HTP of the composition is determined at 20° C. It has a helical twisting power HTP of −7.2.

By comparison, the corresponding compound which is unsubstituted instead of the tert-butyl group only gives a helical twisting power HTP of −1.36.

EXAMPLE 8

1.0% by weight of product 11 from Example 3 is added to the liquid-crystalline base mixture from Example 6, and the helical twisting power HTP of the composition is determined at 20° C. It has a helical twisting power HTP of −13.2.

EXAMPLE 9

1.0% by weight of product 28 from Example 5 is added to the liquid-crystalline base mixture from Example 6, and the helical twisting power HTP of the composition is determined at 20° C. It has a helical twisting power HTP of −1.6.

The invention claimed is:

1. A chiral dopant having a laterally alkylated phenyl unit of formula I:

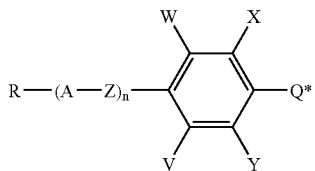
(I)

in which:
Q* is

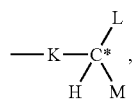,

K is —CH$_2$—, —O—, —CH$_2$CH$_2$—, —OCH$_2$—, —CH$_2$O—, —OCF$_2$—, —CF$_2$O—, —C≡C—, —CH═CH— or a single bond, L and M are alkyl, cycloalkyl, O-alkyl, or aryl, where L must be different from M, R is —H, F, Cl, or an alkyl radical having 1 to 12 carbon atoms or alkenyl radical having 2 to 12 carbon atoms, which is unsubstituted or at least monosubstituted by halogen, and in which one or more non-adjacent —CH$_2$— groups are optionally replaced by —O— or —S— and/or —C≡C—, A are, independently of one another, a single bond, 1,4-phenylene, in which one or more H atoms are optionally replaced by F, 1,4-cyclohexylene, in which one or two CH$_2$ groups are optionally replaced by —O—, or 1,4-bicyclo[2.2.2]octanyl, Z are, independently of one another, a single bond, —CH$_2$-CH$_2$—, —O—CH$_2$—, —CH$_2$—O—, —CF$_2$—O—, —O—CF$_2$—, —CF$_2$-CF$_2$- or —C≡C—, V and W are, independently of one another, H, F, Cl, or a linear or branched alkyl or alkoxy having 1 to 12 carbon atoms which is unsubstituted or monosubstituted or polysubstituted by halogen, X and Y are, independently of one another, H, F, Cl, trimethylsilyl, or a linear or branched alkyl or alkoxy having o or p carbon atoms which is unsubstituted or monosubstituted or polysubstituted by halogen, o and p are, independently of one another, identical or different and are integers in the range from 1 to 12, and n is 1 to 3, with the proviso that X and/or Y is/are either an unsubstituted or halogen-substituted alkyl or alkoxy radical having o or p carbon atoms, where the sum o+p is ≧2, or a trimethylsilyl radical.

2. A chiral dopant according to claim 1, wherein one of L and M is cycloalkyl, O-alkyl, or aryl.

3. A chiral dopant according to claim 1, wherein Q* is

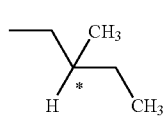
(h)

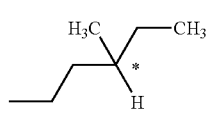
(i)

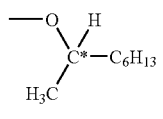
(m)

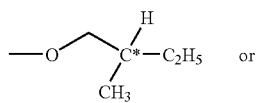  or
(r)

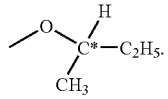.
(s)

4. A chiral dopant according to claim 1, which is a compound of formula (Ia), (Ib) or (Ic).

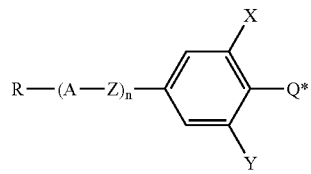
(Ia)

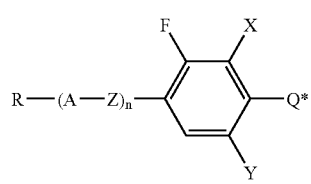
(Ib)

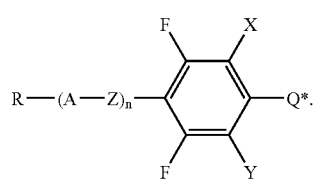
(Ic)

5. A liquid-crystalline mixture comprising at least one chiral dopant according to claim 1.

6. An electro-optical display element containing a liquid-crystalline mixture according to claim 5.

7. A chiral dopant according to claim 1, wherein one of L and M is alkyl.

8. A chiral dopant according to claim 1, wherein both L and M are alkyl.

9. A chiral dopant according to claim 1, wherein Q* is

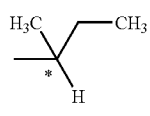
(a)

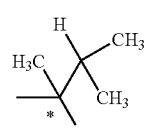
(b)

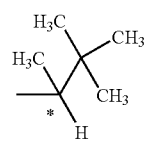
(c)

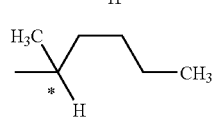
(d)

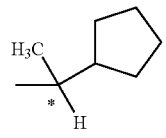
(e)

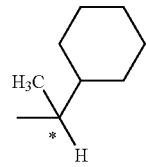
(f)

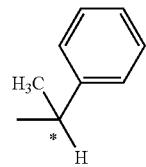
(g)

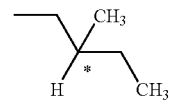
(h)

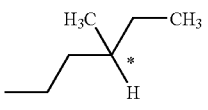
(i)

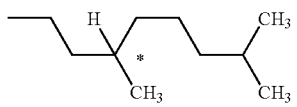
(k)

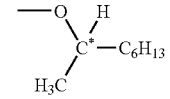
(m)

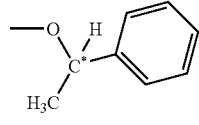
(n)

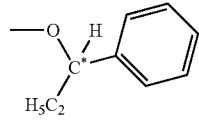
(o)

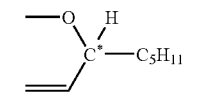
(p)

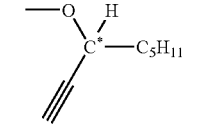
(q)

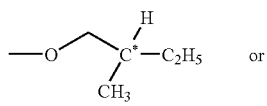
(r)

or

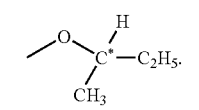
(s)

10. A chiral dopant according to claim 3, which is a compound of formula (Ia), (Ib) or (Ic)

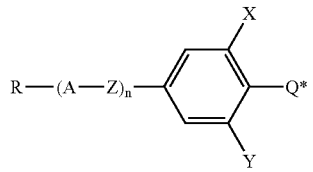
(Ia)

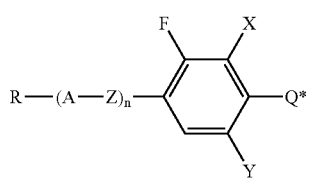
(Ib)

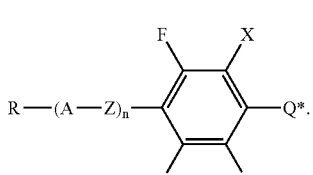
(Ic)

11. A chiral dopant according to claim 8, which is a compound of formula (Ia), (Ib) or (Ic)

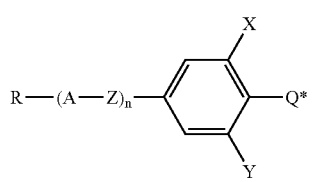
(Ia)

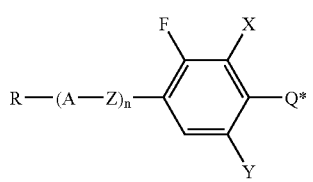
(Ib)

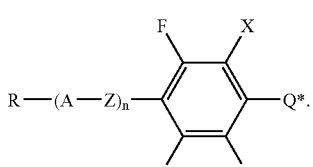
(Ic)

12. A chiral dopant according to claim 9, which is a compound of formula (Ia), (Ib) or (Ic)

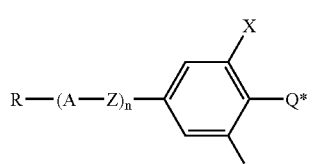
(Ia)

-continued

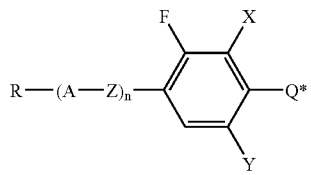
(Ib)

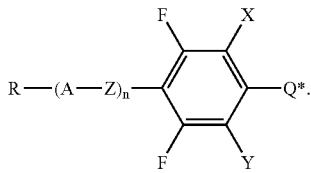
(Ic)

13. A chiral dopant according to claim 1, which is a compound of one of the following formula

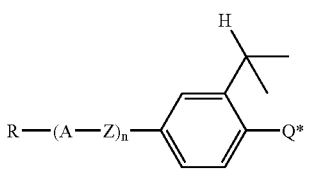
(Iaa)

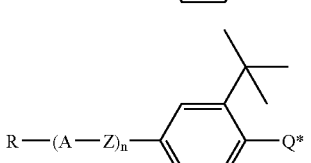
(Iab)

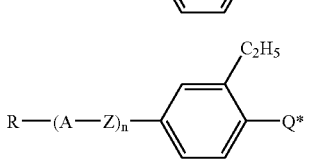
(Iac)

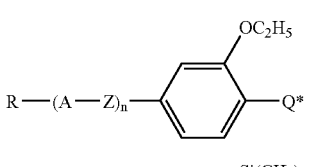
(Iad)

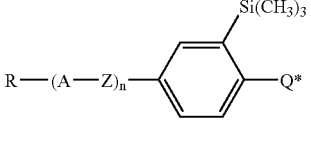
(Iae)

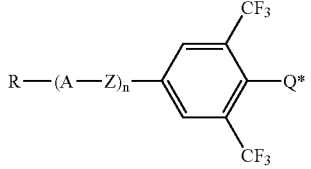
(Iaf)

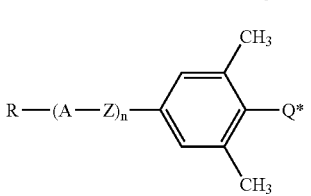
(Iag)

-continued
(Iah)
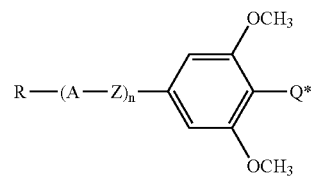
(Iai)
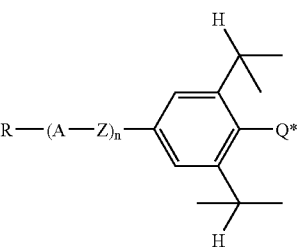
(Iba)
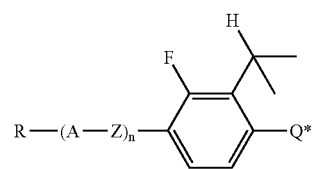
(Ibb)
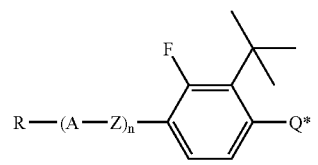
(Ibc)
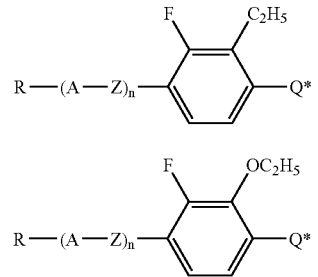
(Ibd)
(Ibe)
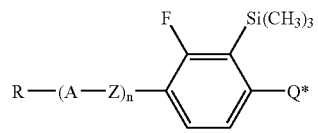
(Ibf)
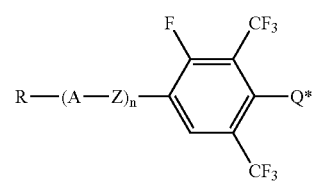
(Ibg)
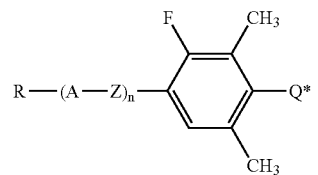
-continued
(Ibh)
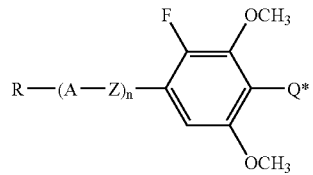
(Ibi)
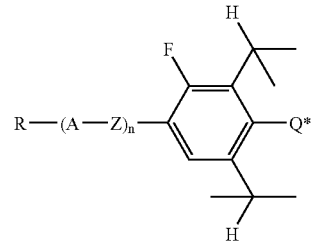
(Ica)
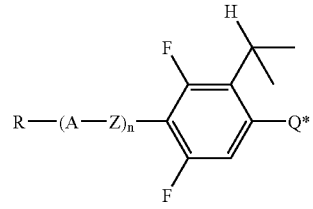
(Icb)
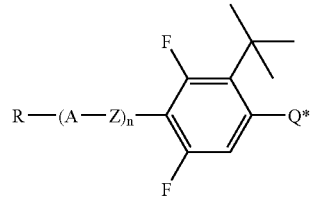
(Icc)
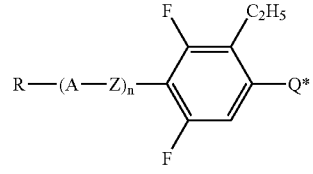
(Icd)
(Ice)
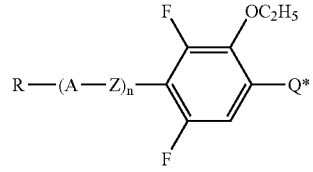
(Icf)
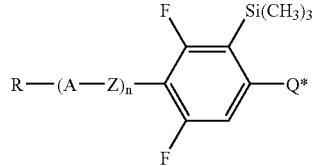

-continued
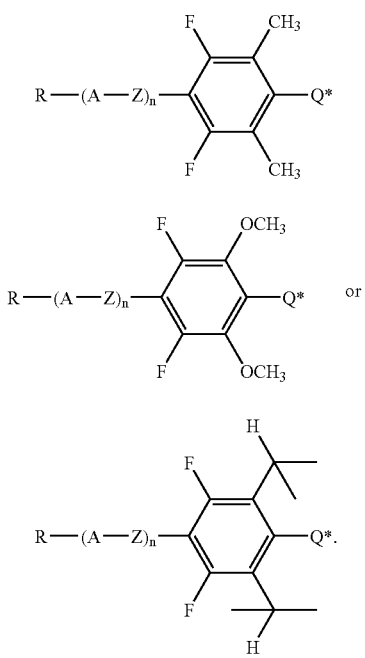
(Icg)
(Ich)
or
(Ici)
14. A chiral dopant according to claim 13, which is a compound of formula (Iab), (Iac), (Iag) or (Ibe).
15. A chiral dopant according to claim 14, wherein Q* is
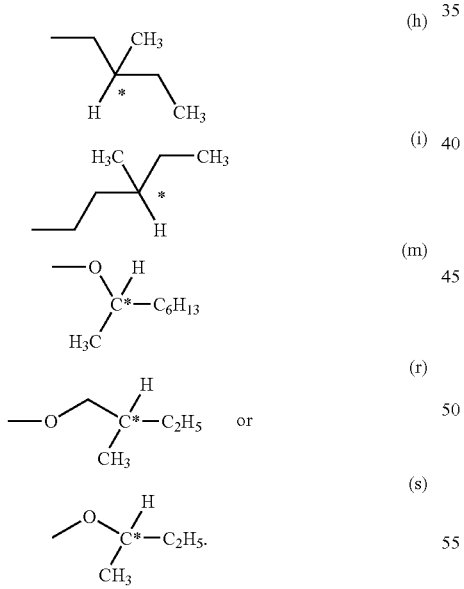
(h)
(i)
(m)
(r)
or
(s)
16. A chiral dopant according to claim 1, wherein R-(A-Z)$_n$ is of one of the following formula
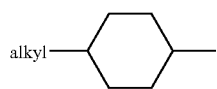
(1)
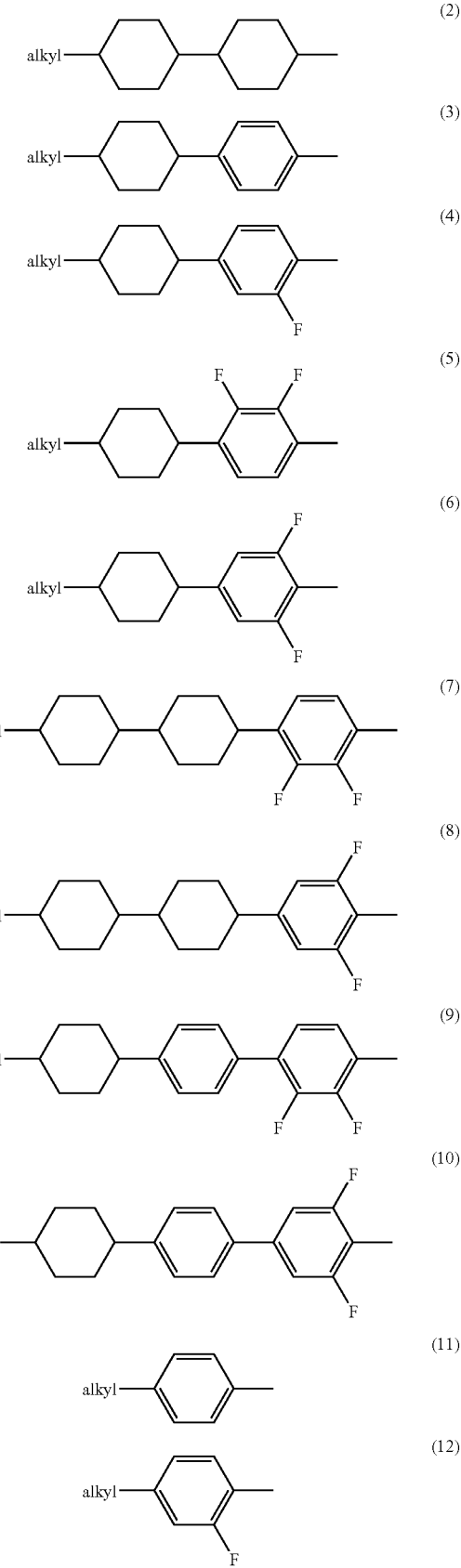
(2)
(3)
(4)
(5)
(6)
(7)
(8)
(9)
(10)
(11)
(12)

-continued

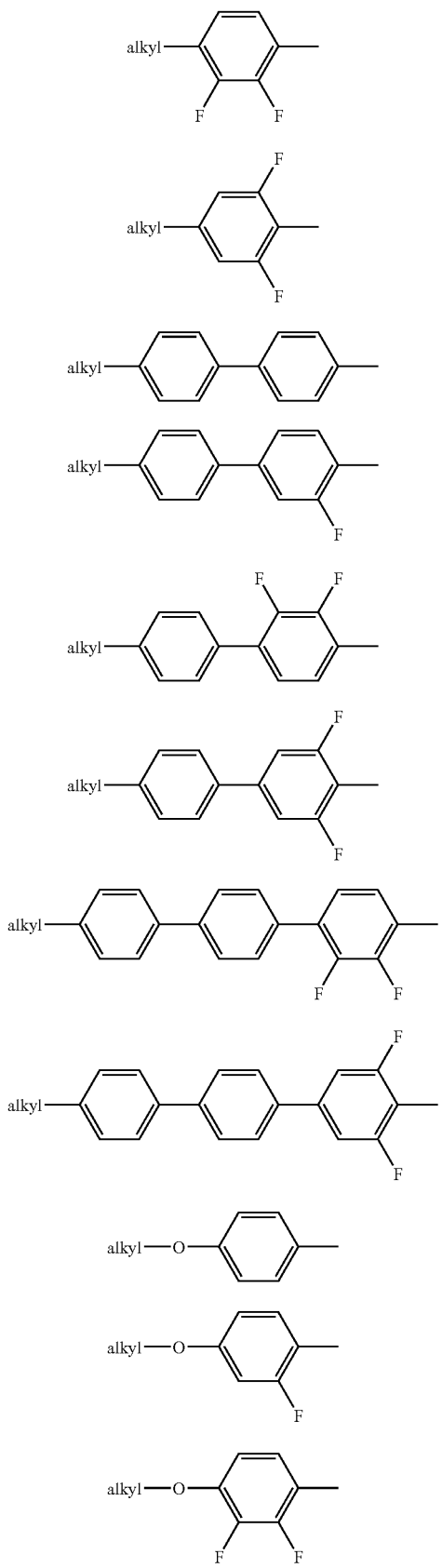

wherein alkyl is an alkyl radical having 1 to 12 carbon atoms, which is straight-chain or branched.

17. A chiral dopant according to claim 16, wherein alkyl is a straight-chain alkyl radical having 1, 2, 3, 4, 5, 6 or 7 carbon atoms.

18. A chiral dopant according to claim 16, wherein R-(A-Z)$_n$ is of formula (5), (7), (9), (17) or (19).

19. A chiral dopant according to claim 1, wherein the compound of formula I is a compound of one of the following formula (Iab′)
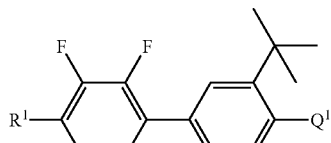
(Iac′)
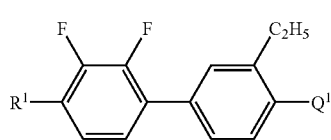
-continued
(Iag′)
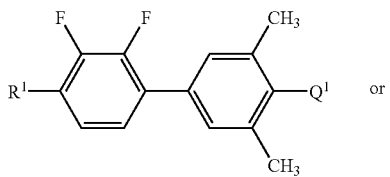
or
(Ibe′)
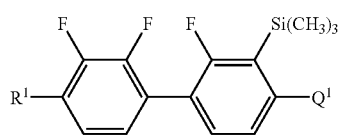
| R¹ | | Q¹ | |
|---|---|---|---|
| alkyl—⬡— | (5′) | CH₃–CH(*)–C₂H₅ with CH₃ | (h) |
| alkyl—⬡—⬡— | (7′) | CH₃–CH(*)–C₂H₅ with CH₃ | (h) |
| Alkyl—⬡—⬢— | (9′) | CH₃–CH(*)–C₂H₅ with CH₃ | (h) |
| alkyl—⬢— | (17′) | CH₃–CH(*)–C₂H₅ with CH₃ | (h) |
| alkyl—⬢—⬢— | (19′) | CH₃–CH(*)–C₂H₅ with CH₃ | (h) |
| alkyl—⬡— | (5′) | H₃C, CH₃, propyl, H | (i) |
| alkyl—⬡—⬡— | (7′) | H₃C, CH₃, propyl, H | (i) |
| alkyl—⬡—⬢— | (9′) | H₃C, CH₃, propyl, H | (i) |

| R¹ | | Q¹ | |
|---|---|---|---|
| alkyl-⬡- | (17') | 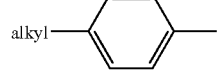 | (i) |
| alkyl-⬡-⬡- | (19') | 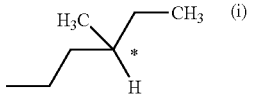 | (i) |
| alkyl-⬢- | (5') | 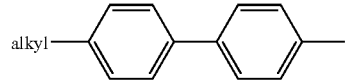 | (m) |
| alkyl-⬢-⬢- | (7') | 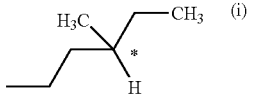 | (m) |
| alkyl-⬢-⬡- | (9') | 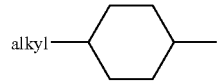 | (m) |
| alkyl-⬡- | (17') | 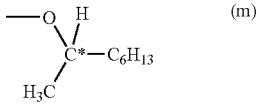 | (m) |
| alkyl-⬡-⬡- | (19') | 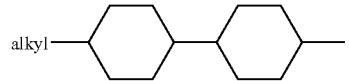 | (m) |
| alkyl-⬢- | (5') | 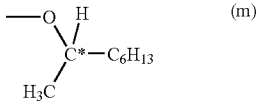 | (r) |
| alkyl-⬢-⬢- | (7') | 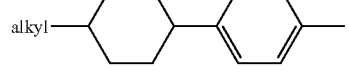 | (r) |
| alkyl-⬢-⬡- | (9') | 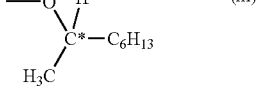 | (r) |
| alkyl-⬡- | (17') | 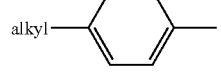 | (r) |
| alkyl-⬡-⬡- | (19') | 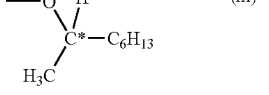 | (r) |
| alkyl-⬢- | (5') | 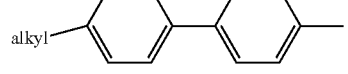 | (s) |

-continued
| R¹ | | Q¹ | |
|---|---|---|---|
| 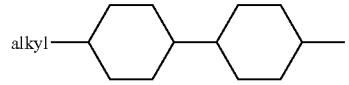 | (7') | 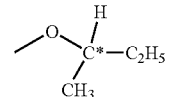 | (s) |
| 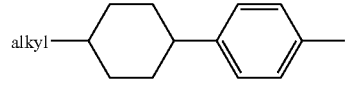 | (9') | 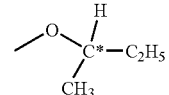 | (s) |
| 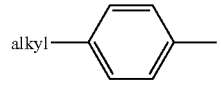 | (17') | 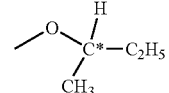 | (s) or |
| 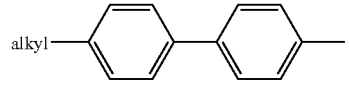 | (19') | 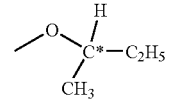 | (s) |
wherein alkyl is a straight-chain alkyl radical having 1 to 7 carbon atoms.
20. A chiral dopant according to claim 1, wherein V, W, X and Y are, each independently of one another, is an alkyl radical and/or an alkoxy radical having from 1 to 7 carbon atoms, which is straight-chain or branched.
* * * * *